United States Patent
Wakabayashi

(10) Patent No.: US 8,641,196 B2
(45) Date of Patent: Feb. 4, 2014

(54) IMAGE FORMING APPARATUS

(75) Inventor: Shuichi Wakabayashi, Okaya (JP)

(73) Assignee: Seiko Epson Corporation (JP)

( * ) Notice: Subject to any disclaimer, the term of this patent is extended or adjusted under 35 U.S.C. 154(b) by 153 days.

(21) Appl. No.: 13/078,065

(22) Filed: Apr. 1, 2011

(65) Prior Publication Data

US 2011/0249241 A1  Oct. 13, 2011

(30) Foreign Application Priority Data

Apr. 8, 2010  (JP) ................................. 2010-089272

(51) Int. Cl.
G03B 21/26 (2006.01)

(52) U.S. Cl.
USPC ................. 353/28; 353/31; 353/46; 353/48; 353/74; 353/99; 345/104; 345/108; 382/318

(58) Field of Classification Search
USPC .......... 353/28, 31, 46, 48, 49, 50, 69, 70, 74, 353/79, 99, 101, 119, 122; 359/196.1, 359/198.1, 199.1, 200.1, 201.1, 202.1, 359/203.1, 204.1, 205.1, 234, 298; 349/5, 349/7–9; 382/318, 312; 345/108, 104
See application file for complete search history.

(56) References Cited

U.S. PATENT DOCUMENTS

| 6,945,652 B2 * | 9/2005 | Sakata et al. ..................... 353/30 |
| 7,664,598 B2 | 2/2010 | Yamamoto et al. |
| 7,901,084 B2 * | 3/2011 | Willey et al. ..................... 353/49 |
| 2007/0223542 A1 * | 9/2007 | Kwon ............................. 372/24 |
| 2008/0170282 A1 * | 7/2008 | Amada et al. ................. 359/196 |
| 2011/0205497 A1 | 8/2011 | Wakabayashi et al. |

FOREIGN PATENT DOCUMENTS

| JP | 08-055282 | 2/1996 |
| JP | 2007-149053 | 6/2007 |
| JP | 4010273 | 9/2007 |
| JP | 2008-116668 | 5/2008 |
| WO | WO2006-080344 | 8/2006 |
| WO | WO-2006-120850 A1 | 11/2006 |

* cited by examiner

*Primary Examiner* — Sultan Chowdhury
(74) *Attorney, Agent, or Firm* — Harness, Dickey & Pierce, P.L.C.

(57) ABSTRACT

An image forming apparatus includes: a light emitting portion emitting light; an optical scanning portion scanning a display surface with the light emitted from the light emitting portion; and a changing portion rotating an image formed on the display surface through the scanning with the light by using a position near the center as a rotation axis to change an orientation of the image.

9 Claims, 23 Drawing Sheets

IMAGE FORMING APPARATUS

BACKGROUND

1. Technical Field

The present invention relates to an image forming apparatus.

2. Related Art

Projectors are known as an apparatus which projects light to a surface of an object such as a screen to display a desired image on the projection surface of the screen. A practically used example of such projectors employs an optical scanner which performs one-dimensional or two-dimensional scanning with light (see, for example, JP-A-2008-116668 (Patent Document 1)).

The projector described in Patent Document 1 has a first optical scanner in which a movable plate having a light reflecting portion is turned about an X axis, a second optical scanner in which a movable plate having a light reflecting portion is turned about a y axis orthogonal to the x axis, and a light source apparatus which emits light such as a laser. In such a projector, the first optical scanner performs scanning with the light emitted by the light source apparatus and the second optical scanner performs scanning with the light after the scanning, thereby performing two-dimensional scanning with the light to display a desired image on a screen.

In such a projector, the image is always displayed in a fixed orientation relative to the orientation of a region in which the image can be displayed (drawable region).

In recent years, in the field of digital signage, proposals have been made in which a screen is installed within the premises of a station, a building, a lobby or the like of a hotel or the like with heavy customer traffic, and a desired image (promotion videos, videos of commercials and the like) is displayed on the screen by using the above-mentioned projector to provide advertising for humans around the screen.

In the projector described in Patent Document 1, however, since the orientation of the image is always fixed relative to the orientation of the drawable region as described above, there has been the problem in which it is difficult for humans to recognize the contents of the image depending on the positions and the orientations of them relative to the drawable region. This presents the problem in which the effect of the advertising (appealing effect) cannot be provided sufficiently, for example.

SUMMARY

An advantage of some aspects of the invention is to provide an image forming apparatus allowing humans to recognize easily the contents of an image.

An image forming apparatus according to an aspect of the invention includes: a light emitting portion emitting light; an optical scanning portion scanning a display surface with the light emitted from the light emitting portion; and a changing portion rotating an image formed on the display surface through the scanning with the light by using a position near the center as a rotation axis to change the orientation of the image.

This allows the orientation of the image to be set to the orientation in which the human can see easily. Thus, the contents of the image can be easily recognized by the human.

Preferably, the image forming apparatus according to the aspect of the invention includes a drawing position changing portion changing the position of the image, and the changing portion changes the orientation of the image based on the activation state of the drawing position changing portion.

This allows the orientation of the image to be changed depending on the position of the image. Even when the position of the image is changed in association with the change of the projection angle, the orientation of the image can be set to a desired orientation. As a result, the contents of the image can be easily seen by the human. In contrast, when the position of the image is changed without changing the orientation of the image, the orientation of the image may be inclined relative to the scanning direction with the light to make it difficult for the human to see the contents of the image.

Preferably, in the image forming apparatus according to the aspect of the invention, the drawing position changing portion has a unit turning mechanism turning the light emitting portion and the optical scanning portion, and the changing portion changes the orientation of the image based on a turning angle of the light emitting portion and the optical scanning portion with the unit turning mechanism.

This can change the position of the image without requiring the adjustment of the alignment of the light emitting portion and the optical scanning portion. In addition, the orientation of the image can be changed in accordance with the position of the image relatively easily.

In the image forming apparatus according to the aspect of the invention, the unit turning mechanism preferably turns the light emitting portion and the optical scanning portion about an axis line orthogonal to the display surface.

This can move the image mainly in a direction of horizontal scanning while suppressing distortion due to the change of the position of the image. In such a case, if the image is moved to the horizontal scanning without changing the orientation of the image, the relationship between the direction of the horizontal scanning and the orientation of the image is displaced in association with the movement. However, such displacement can be corrected by changing the orientation of the image. As a result, the advantages of the application of the invention are significant in such a case.

Preferably, the image forming apparatus according to the aspect of the invention includes a sensing portion sensing whether or not a human is present within a sensing region set near the display surface and sensing the moving state of the human when the human is present within the sensing region, an control portion controlling the driving of the drawing position changing portion based on the sensing result of the sensing portion.

This can change the position of the image in accordance with the moving state of the human. Thus, the contents of the image can be recognized easily by the human.

In the image forming apparatus according to the aspect of the invention, the changing portion preferably changes the orientation of the image based on the activation state of the drawing position changing portion and the sensing result of the sensing portion.

This can set the orientation of the image to the orientation in which the human can see easily.

In the image forming apparatus according to the aspect of the invention, the changing portion preferably changes the orientation of the image to be fixed relative to the orientation of the human.

This allows the human to seethe contents of the image easily.

In the image forming apparatus according to the aspect of the invention, when the human is moving within the sensing region, the control portion preferably controls the driving of the drawing position changing portion such that the position of the image is changed to remain located forward of the moving direction of the human.

This allows the human to seethe contents of the image easily.

In the image forming apparatus according to the aspect of the invention, the changing portion preferably has the function of performing rotation processing of video data.

This can rotate the image with a position near the center used as the rotation axis.

In the image forming apparatus according to the aspect of the invention, the changing portion preferably has a video data storing portion storing the video data, a video data computing portion having the function of performing the rotation processing of the video data stored in the video data storing portion, and a light source modulating portion driving the light emitting portion based on the computing result of the video data computing portion.

This allows the sequential rotation processing of the video data to change the orientation of the image.

In the image forming apparatus according to the aspect of the invention, the optical scanning portion preferably includes an optical scanner provided with a movable plate including a light reflecting portion reflecting the light emitted from the light emitting portion, the movable plate being turnable about a single axis or two axes orthogonal to each other, the optical scanner performing scanning with the light reflected by the light reflecting portion through the turning.

This can achieve the image forming apparatus with the small and simple configuration.

In the image forming apparatus according to the aspect of the invention, the light emitting portion preferably emits laser light.

This allows a focus free configuration, proximate projection, and setting of the projection position at an arbitrary position without being limited by the installation position. In addition, since the use of the laser light can omit or simplify an optical system such as lenses for providing collimated light, it is possible to reduce the size of the light emitting portion, and thus the size of the image forming apparatus.

DESCRIPTION OF EXEMPLARY EMBODIMENTS

Preferred embodiments of an image forming apparatus according to the invention will hereinafter be described with reference to the accompanying drawings.

Embodiment 1

Figure 1:
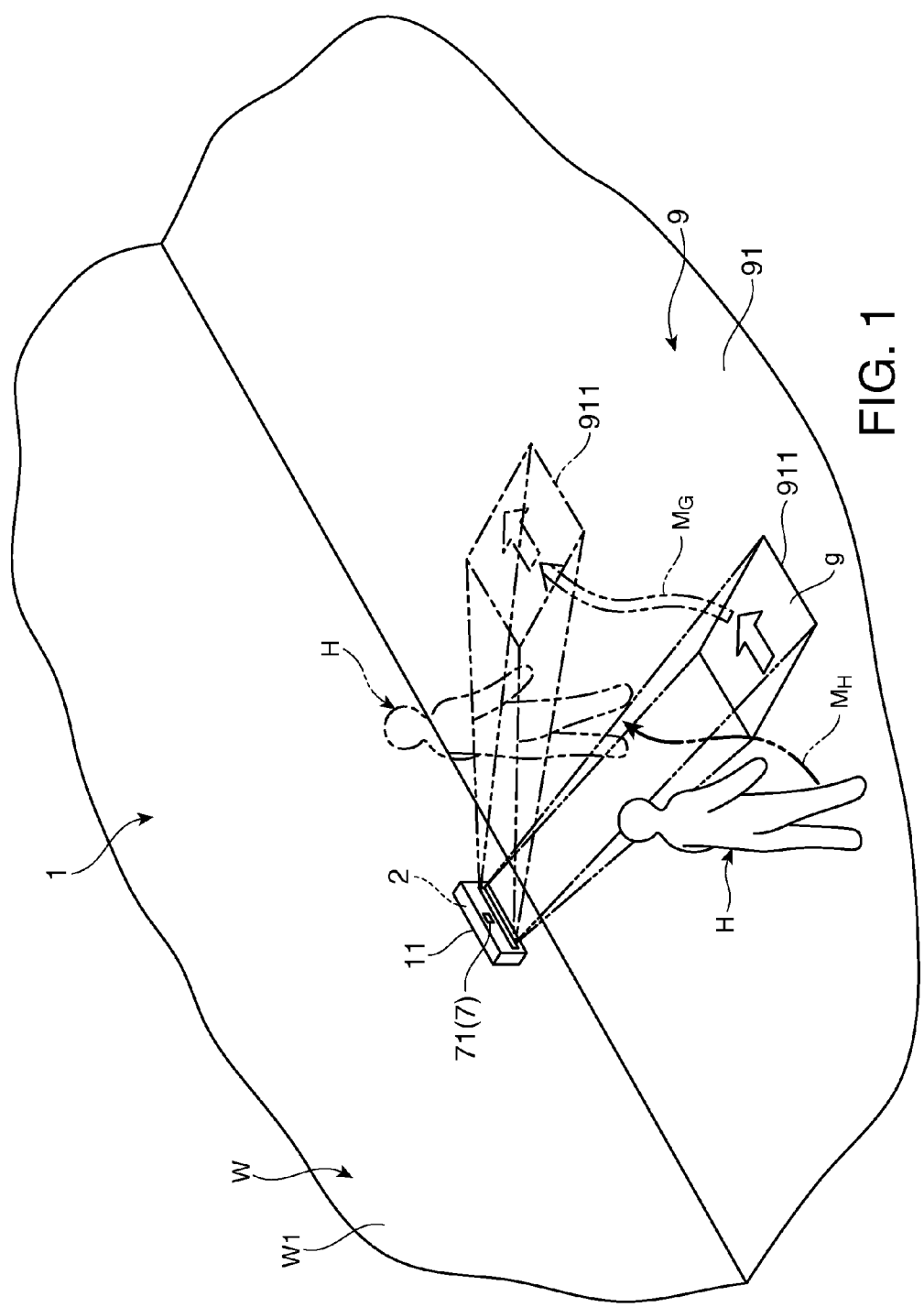
FIG. 1 is a diagram showing Embodiment 1 of an image forming apparatus according to the invention.
Figure 2:
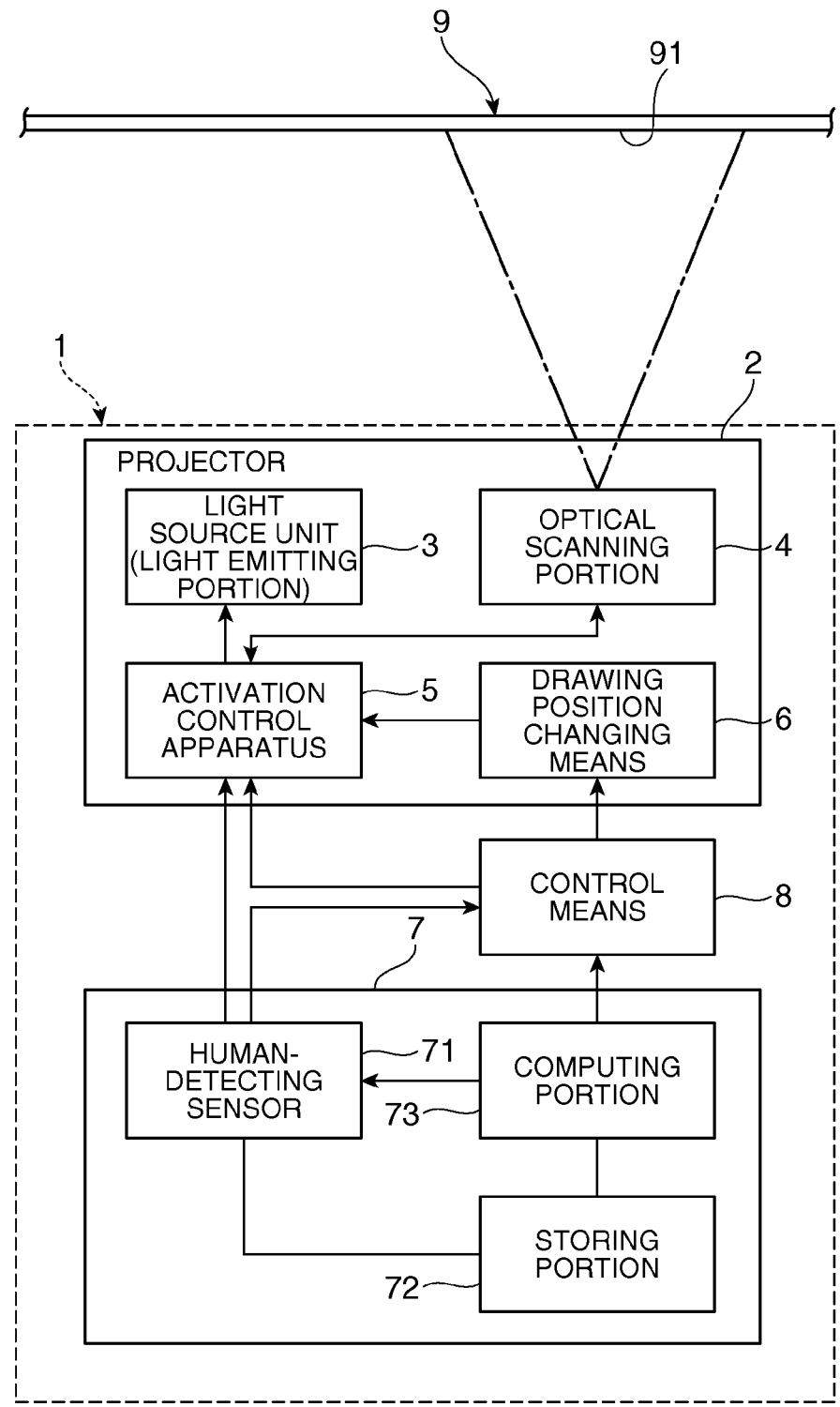
FIG. 2 is a block diagram showing the schematic configuration of the image forming apparatus shown in FIG. 1.
Figure 3:
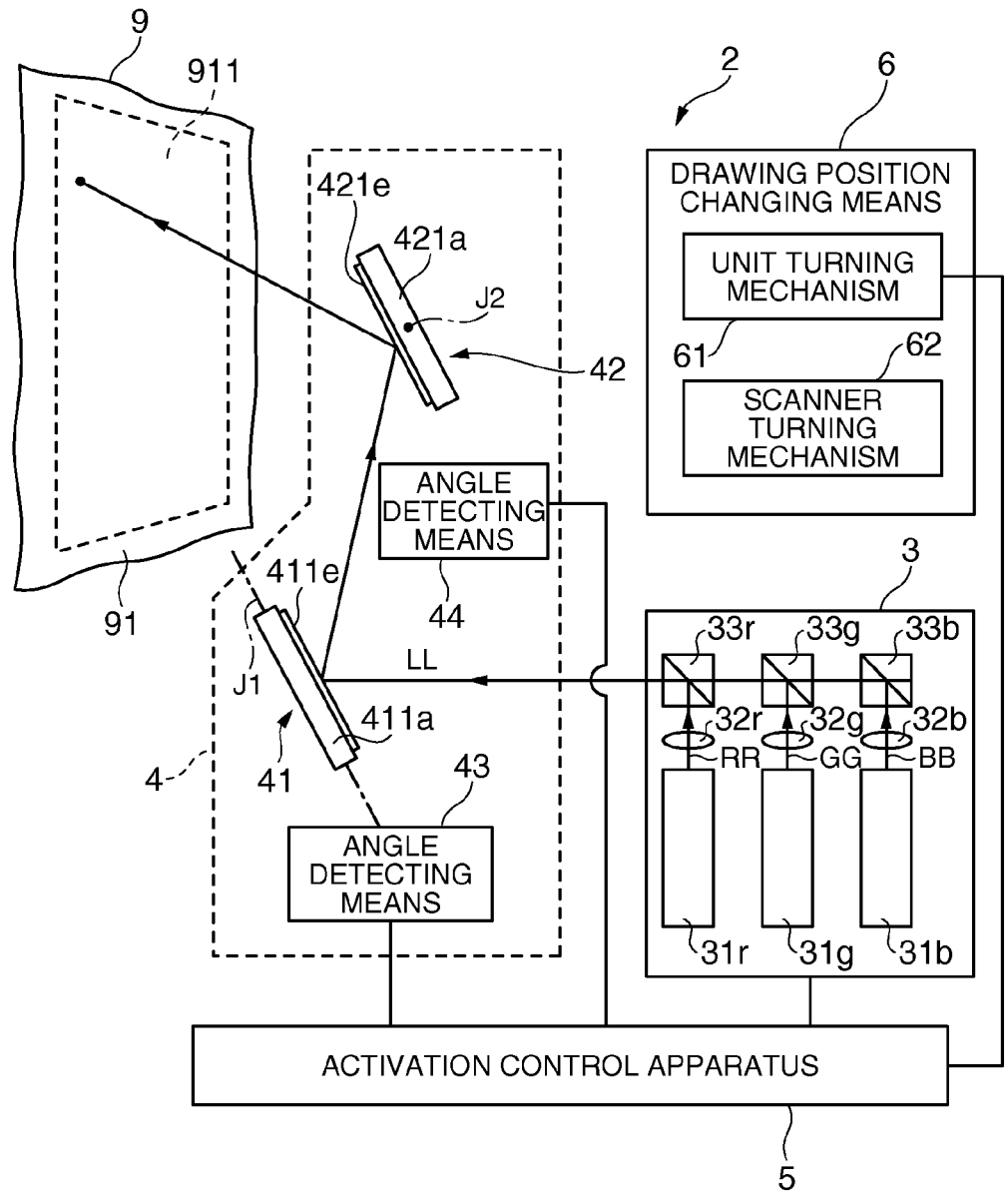
FIG. 3 is a diagram showing the schematic configuration of a projector included in the image forming apparatus shown in FIG. 2.
Figure 4:
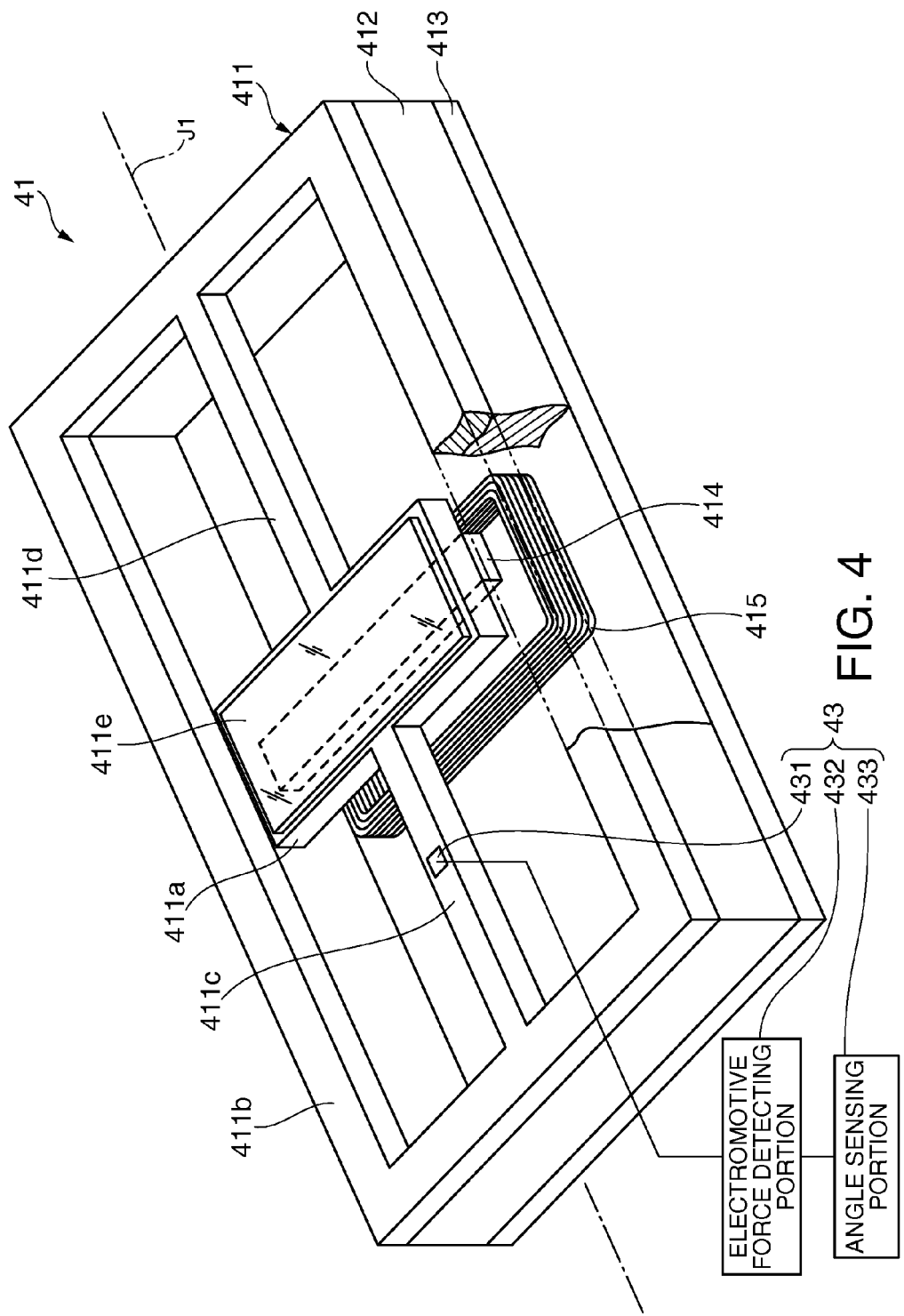
FIG. 4 is a perspective diagram partially showing in section an optical scanner included in the projector shown in FIG. 3.
Figure 5A:
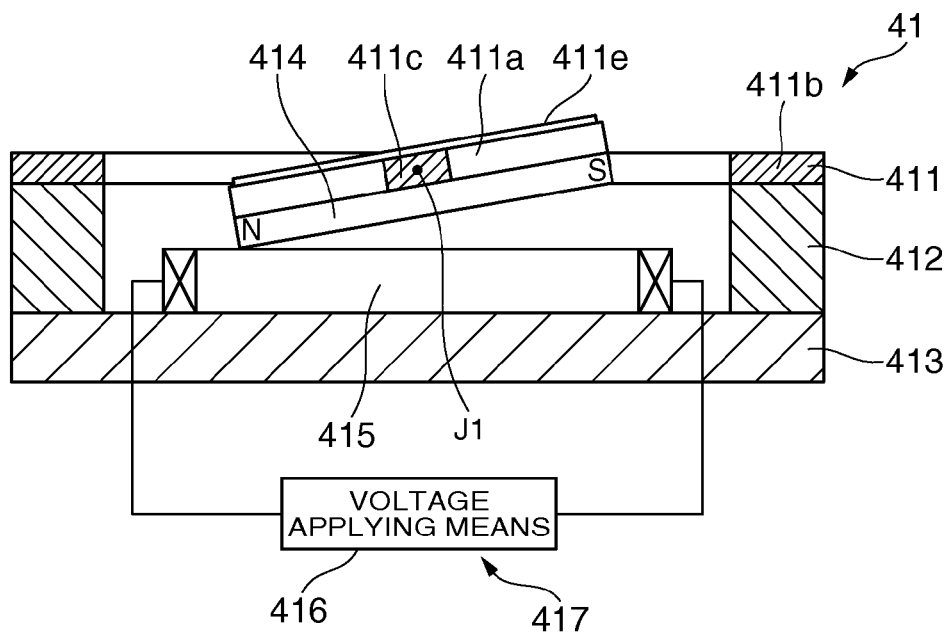
FIGS. 5A and 5B are section views for explaining the operation of the optical scanner shown in FIG. 4.
Figure 5B:
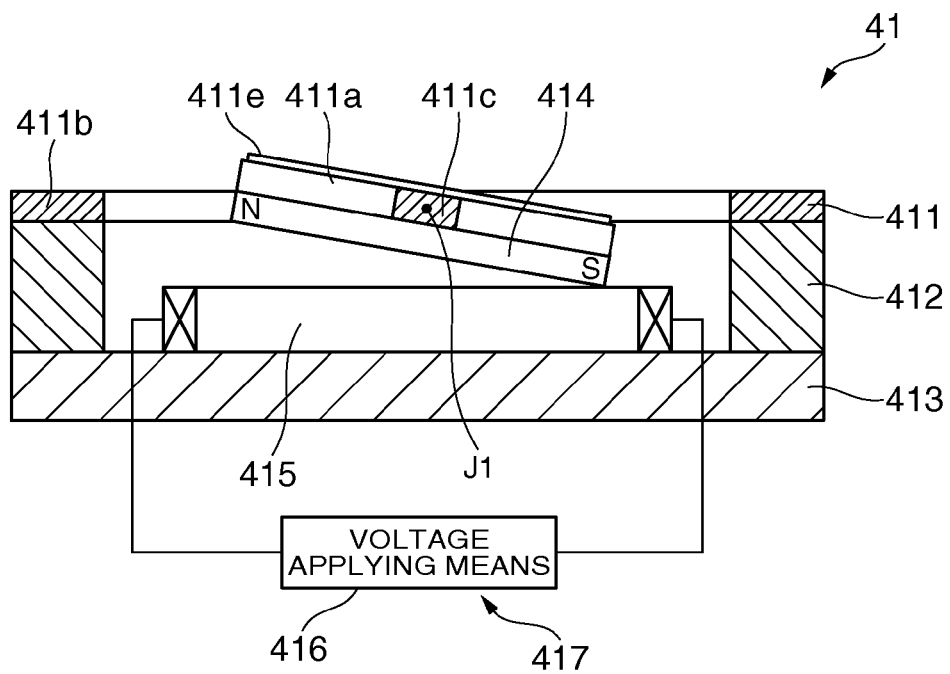
Figure 6:
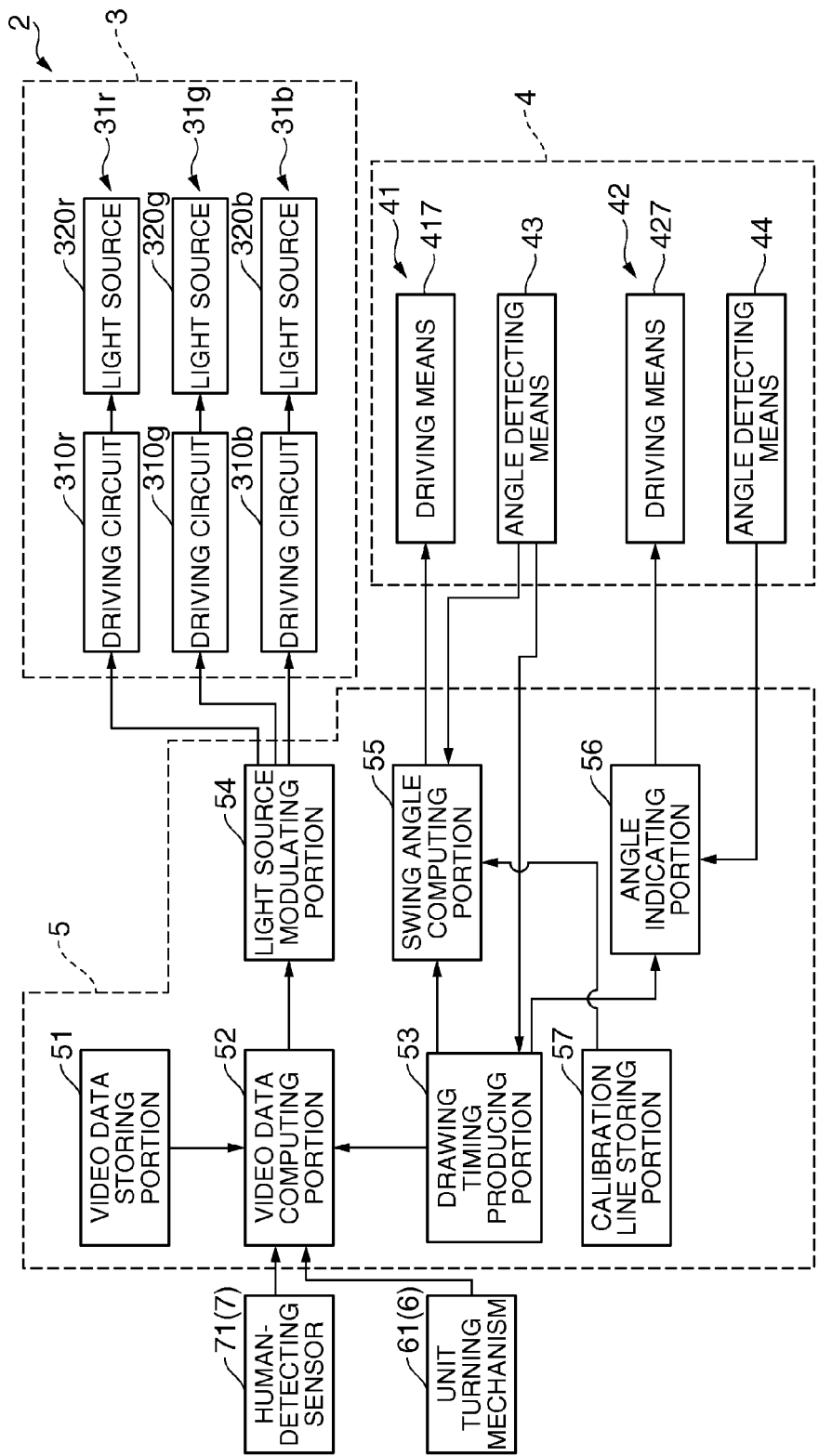
FIG. 6 is a block diagram showing a control system (an activation control portion, an optical scanning portion, and a light source unit) of the projector shown in FIG. 3.
Figure 7:
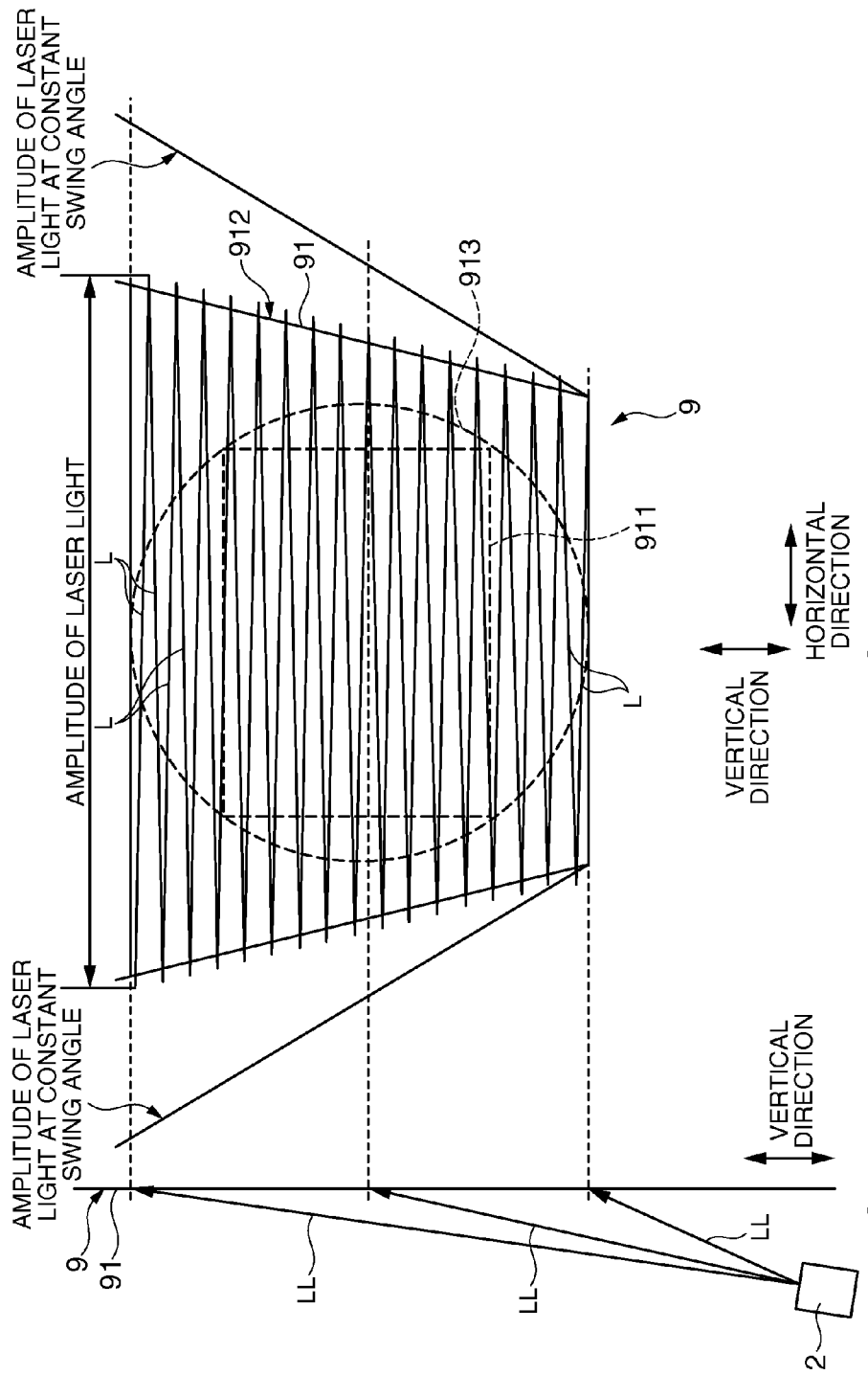
FIGS. 7A and 7B are diagrams for explaining the operation of the projector shown in FIG. 3 (FIG. 7A is a side view and FIG. 7B is a front view).
Figure 8:
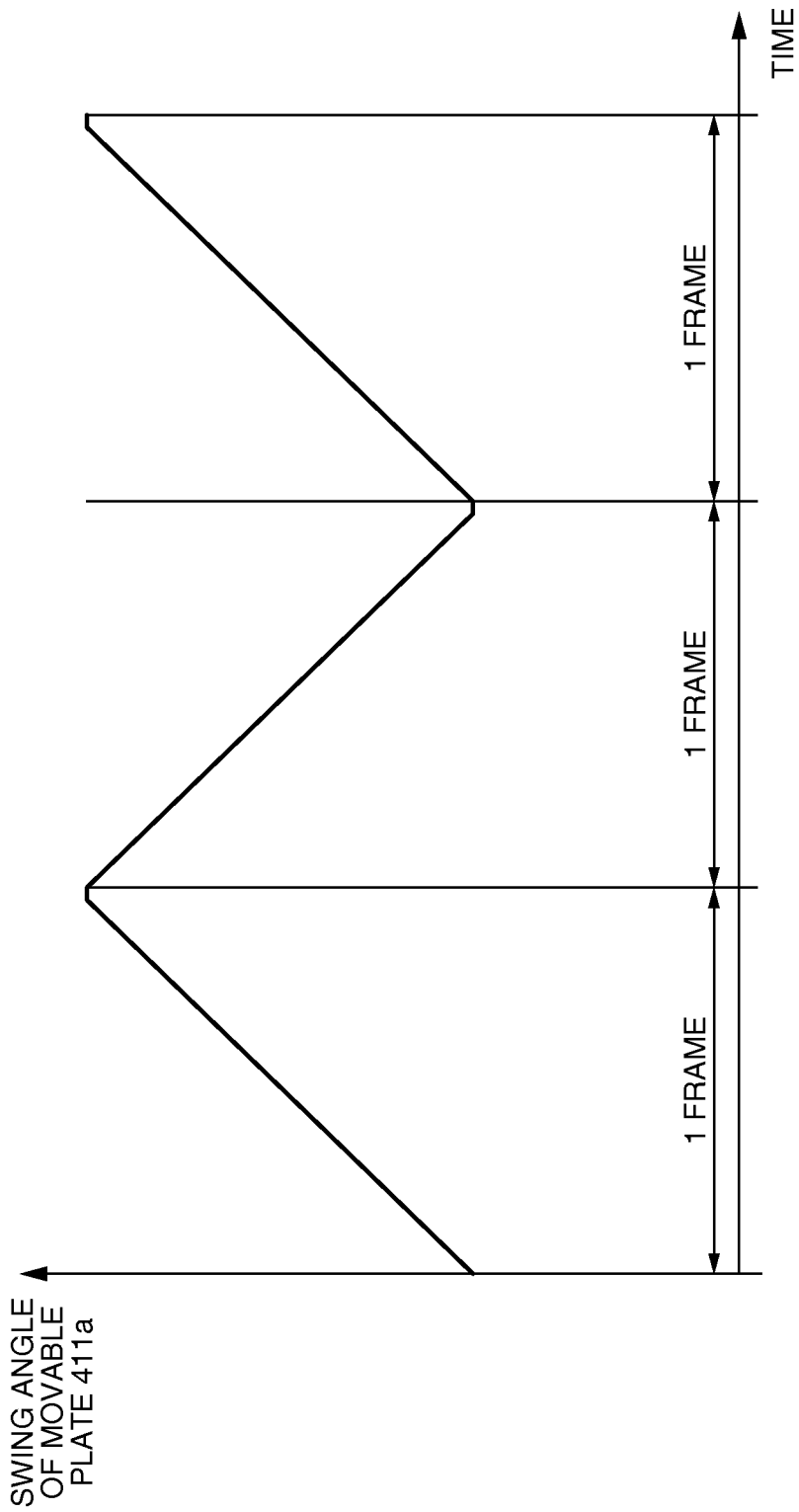
FIG. 8 is a graph showing the transitions of the swing angle of a movable plate (the changes of the swing angle over time) in the optical scanner (the optical scanner for horizontal scanning) in the activation of the projector shown in FIG. 3.
Figure 9:
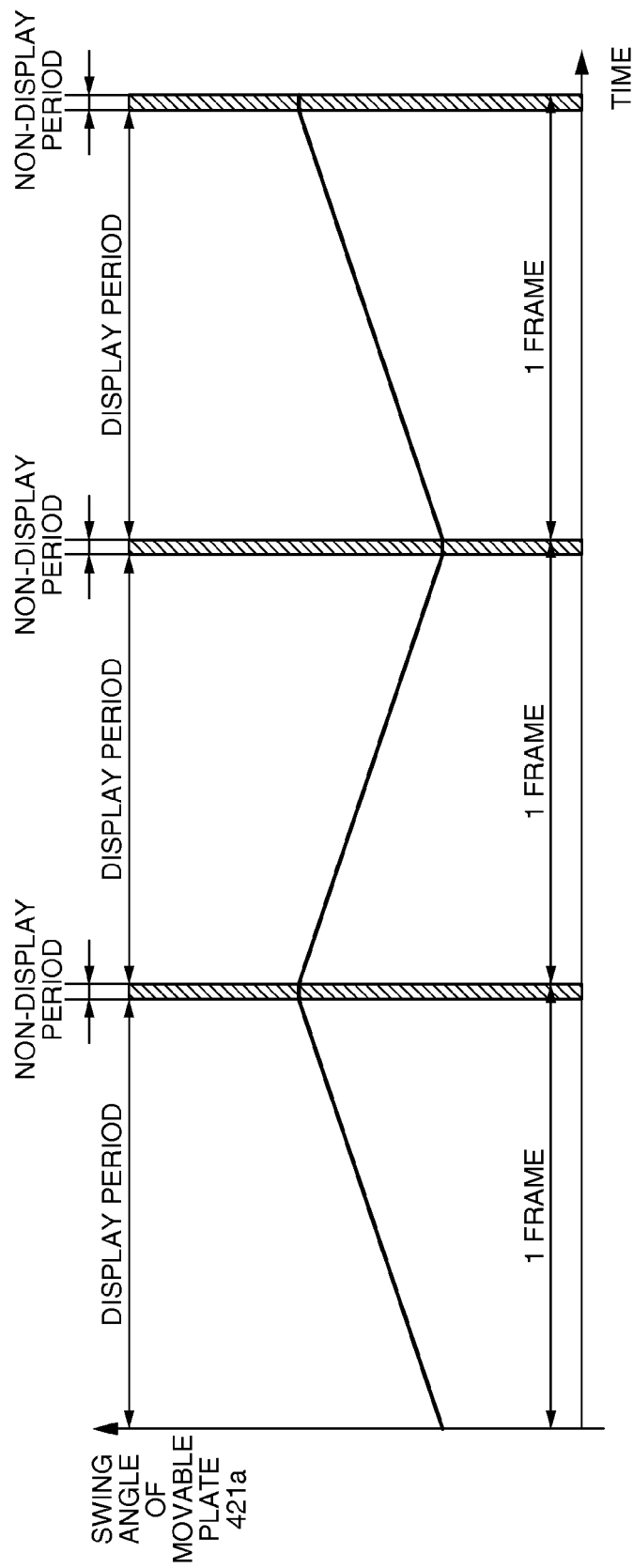
FIG. 9 is a graph showing the transitions of the swing angle of a movable plate (the changes of the swing angle over time) in the optical scanner (the optical scanner for vertical scanning) in the activation of the projector shown in FIG. 3.
Figures 10A, 10B:
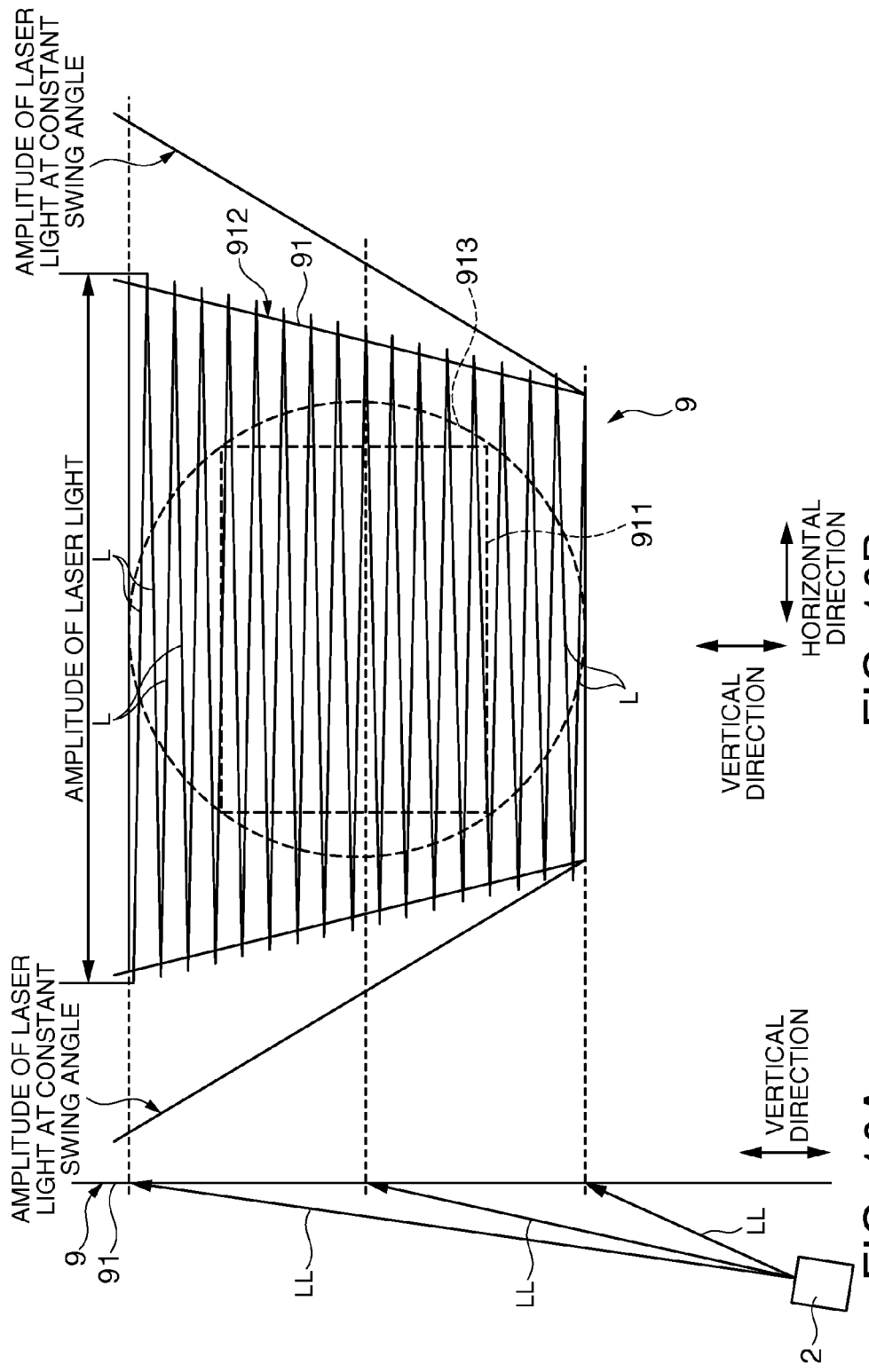
FIGS. 10A and 10B are diagrams showing a modification of the operation of the projector shown in FIG. 3 (FIG. 10A is a side view and FIG. 10B is a front view).
Figure 11A:
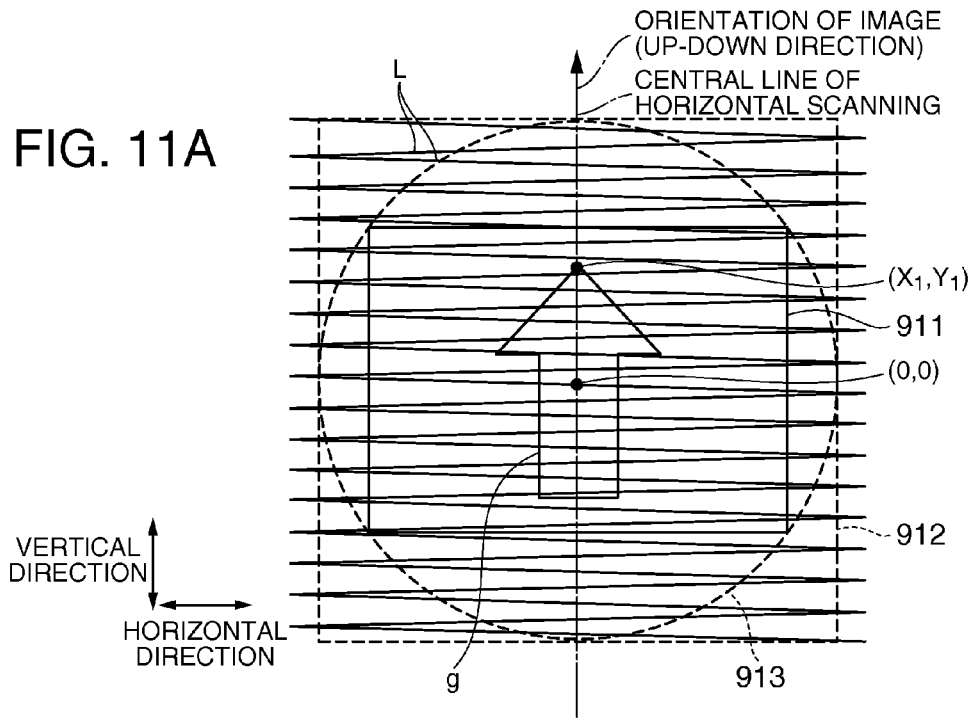
FIGS. 11A and 11B are diagrams for explaining the operation (the change of the orientation of the image) of the projector shown in FIG. 3 (FIG. 11A is a diagram before rotation and FIG. 11B is a diagram after the rotation).
Figure 11B:
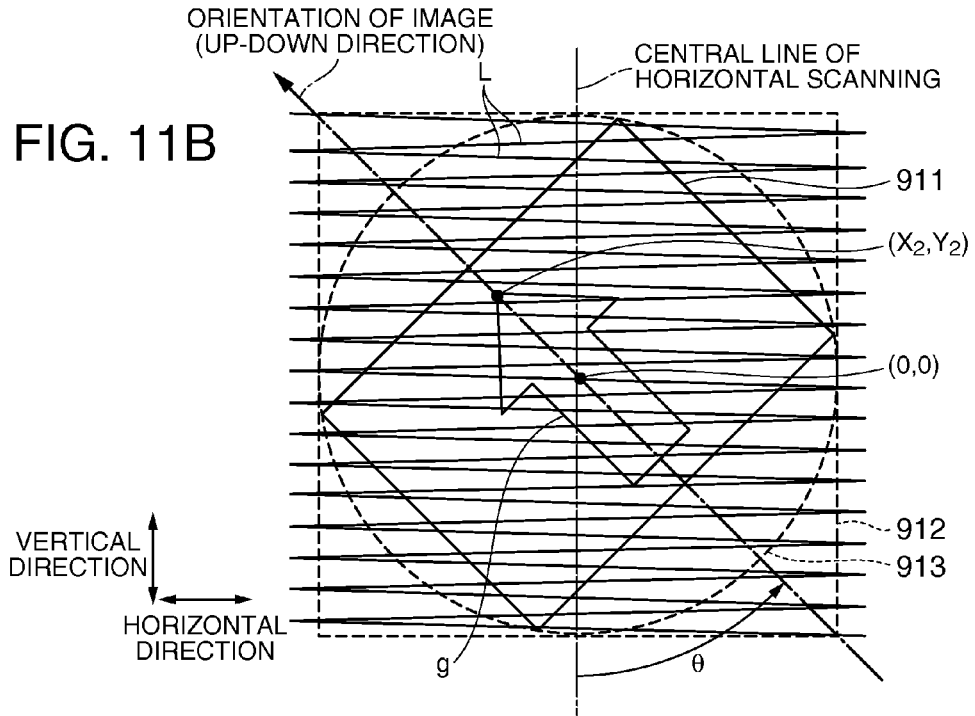
Figure 12:
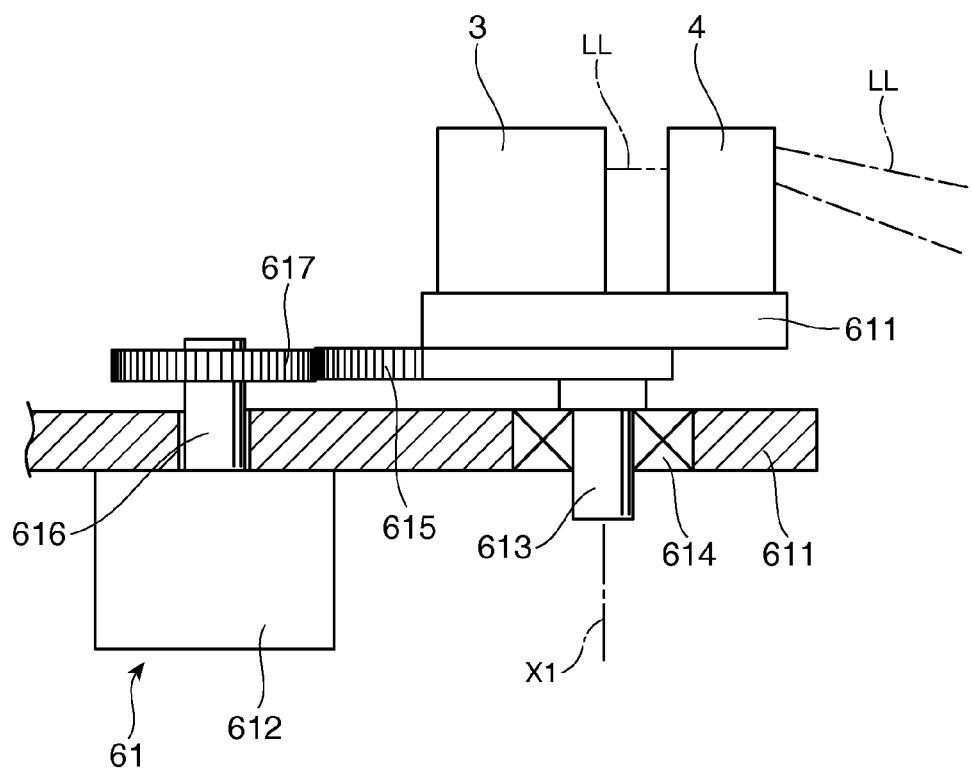
FIG. 12 is a side view partially showing in section a unit turning mechanism of drawing position changing portion included in the projector shown in FIG. 3.
Figure 13B:
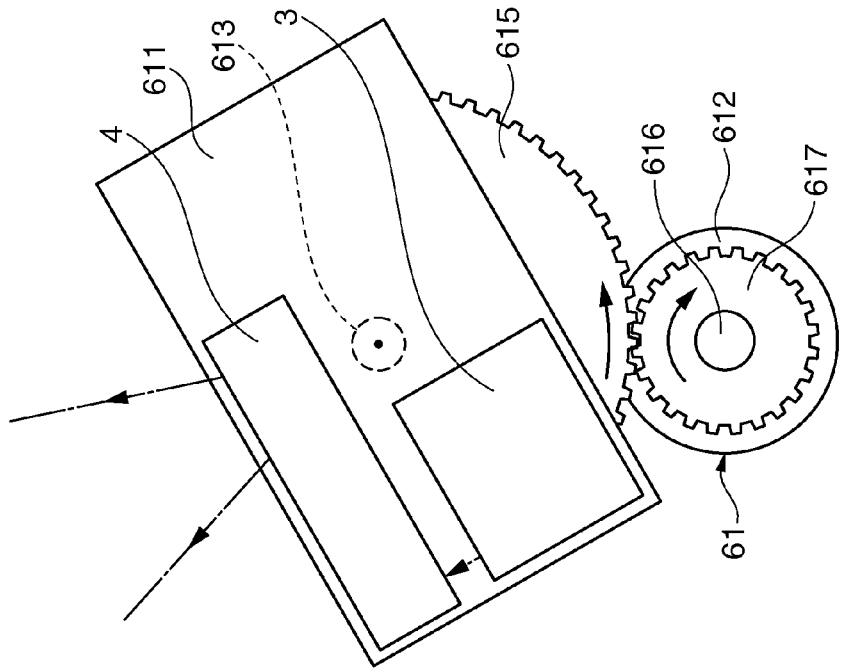
FIGS. 13A and 13B are top view for explaining the operation of the unit turning mechanism shown in FIG. 12.
Figure 13A:
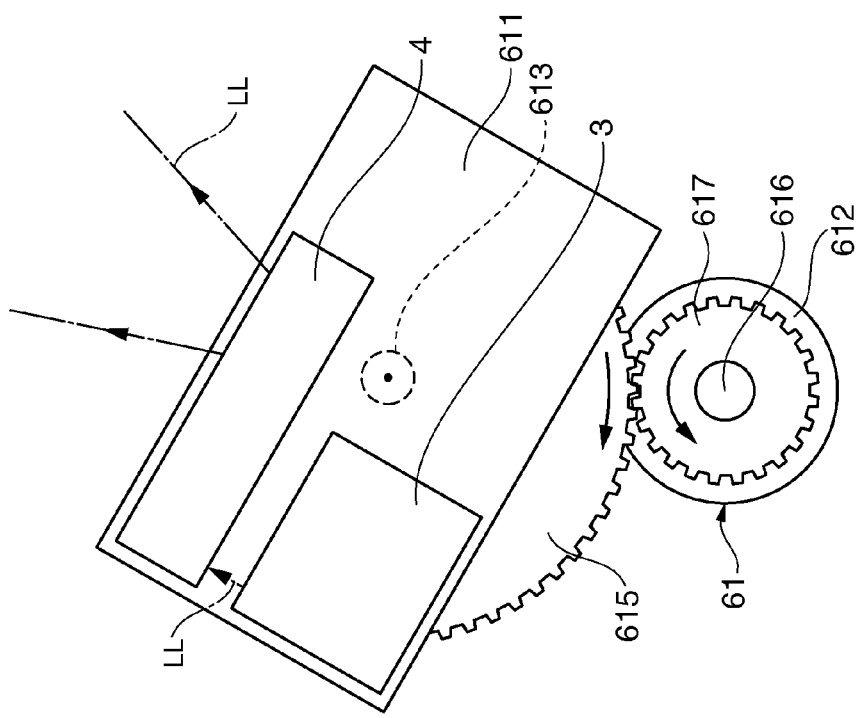
Figure 14:
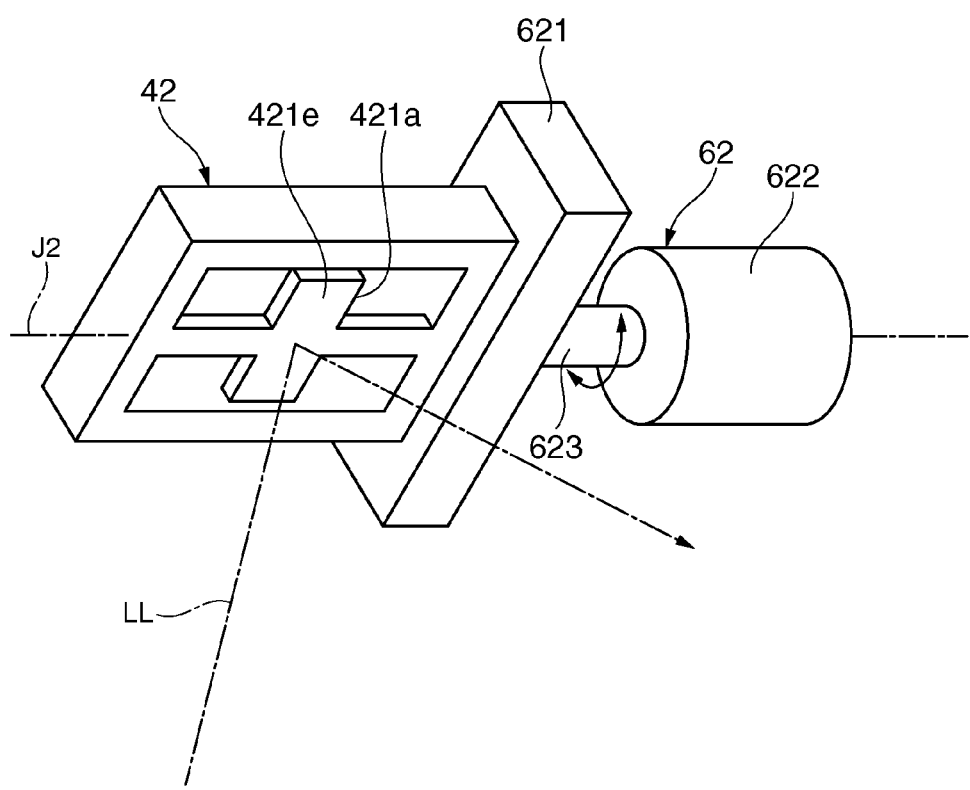
FIG. 14 is a perspective view showing a scanner turning mechanism of the drawing position changing portion included in the projector shown in FIG. 3.
Figure 15:
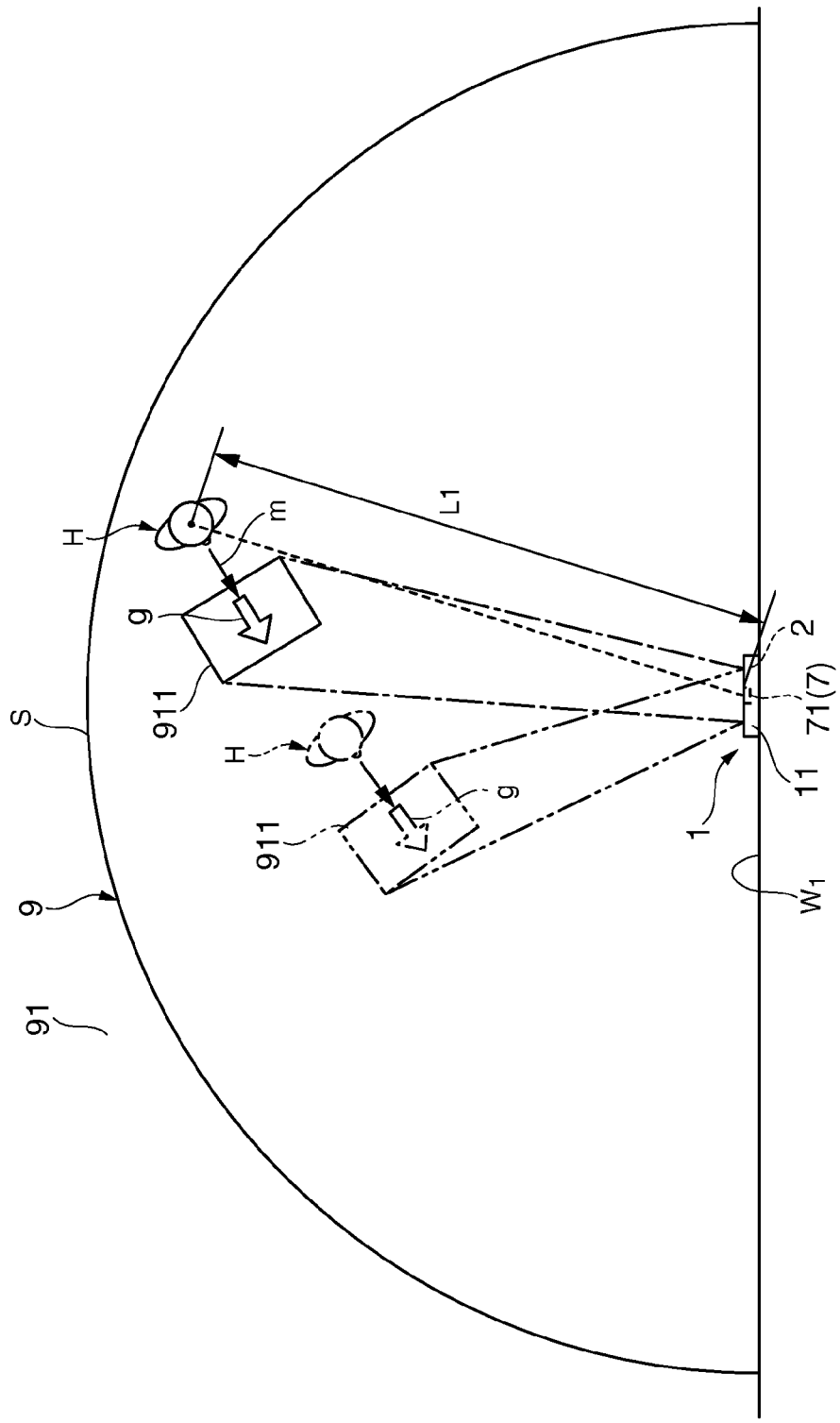
FIG. 15 is a top view for explaining the operation of the image forming apparatus shown in FIG. 1.
Figure 16:
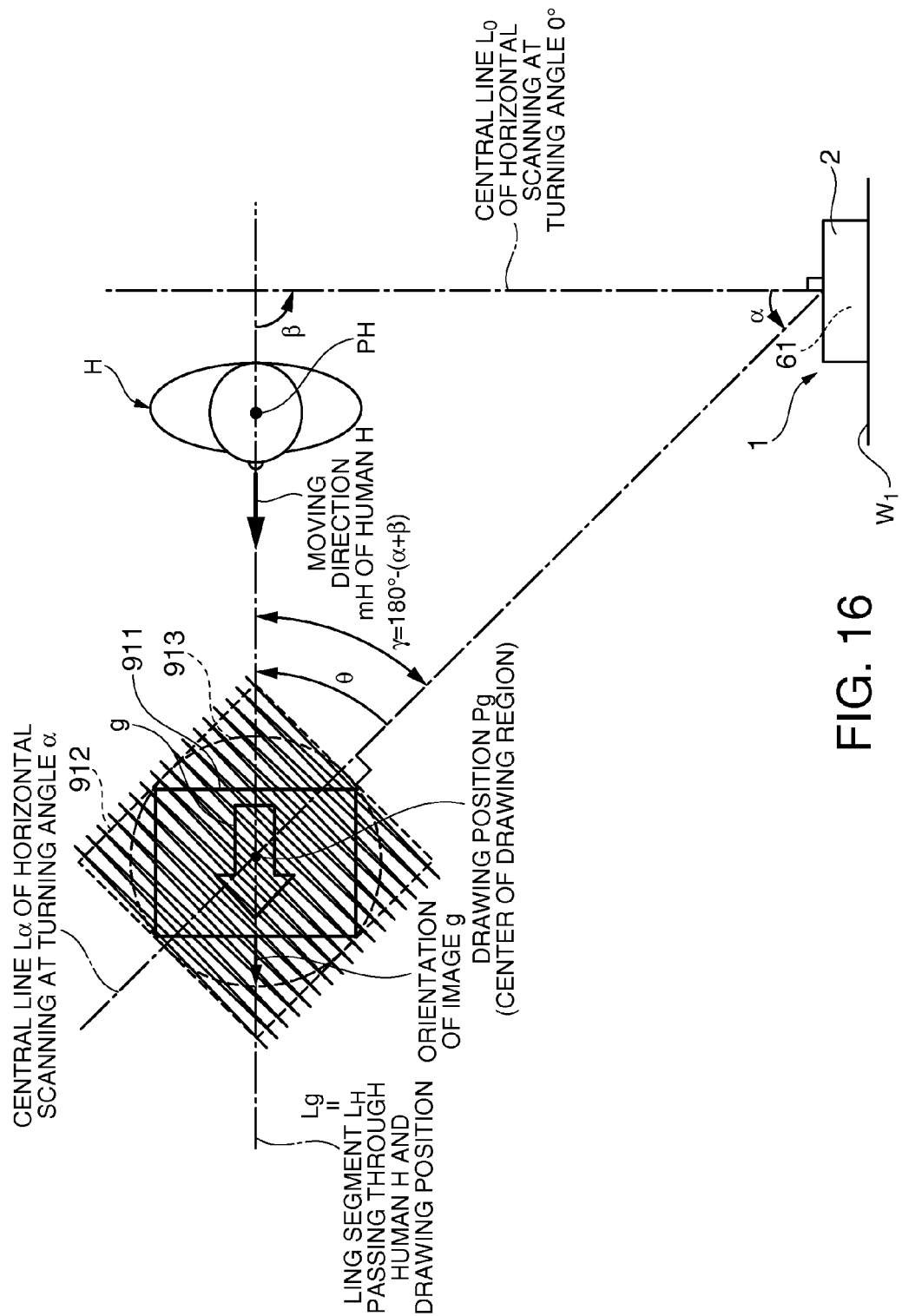
FIG. 16 is a top view for explaining the operation (the orientation of the image) of the image forming apparatus shown in FIG. 1.

FIG. 1 is a diagram showing Embodiment 1 of the image forming apparatus according to the invention, FIG. 2 is a block diagram showing the schematic configuration of the image forming apparatus shown in FIG. 1, FIG. 3 is a diagram showing the schematic configuration of a projector included in the image forming apparatus shown in FIG. 2, FIG. 4 is a perspective diagram partially showing in section an optical scanner included in the projector shown in FIG. 3, FIGS. 5A and 5B are section views for explaining the operation of the optical scanner shown in FIG. 4, FIG. 6 is a block diagram showing a control system (an activation control portion, an optical scanning portion, and a light source unit) of the projector shown in FIG. 3, FIGS. 7A and 7B is a diagram for explaining the operation of the projector shown in FIG. 3 (FIG. 7A is a side view and FIG. 7B is a front view), FIG. 8 is a graph showing the transitions of the swing angle of a movable plate (the changes of the swing angle over time) in the optical scanner (the optical scanner for horizontal scanning) in the activation of the projector shown in FIG. 3, FIG. 9 is a graph showing the transitions of the swing angle of a movable plate (the changes of the swing angle over time) in the optical scanner (the optical scanner for vertical scanning) in the activation of the projector shown in FIG. 3, FIGS. 10A and 10B is a diagram showing a modification of the operation of the projector shown in FIG. 3 (FIG. 10A is a side view and FIG. 10B is a front view), FIGS. 11A and 11B is a diagram for explaining the operation (the change of the orientation of the image) of the projector shown in FIG. 3 (FIG. 11A is a diagram before rotation and FIG. 11B is a diagram after the rotation), FIG. 12 is a side view partially showing in section a unit turning mechanism of a drawing position changing portion included in the projector shown in FIG. 3, FIGS. 13A and 13B are top views for explaining the operation of the unit turning mechanism shown in FIG. 12, FIG. 14 is a perspective view showing a scanner turning mechanism of the drawing position changing portion included in the projector shown in FIG. 3, FIG. 15 is a top view for explaining the operation of the image forming apparatus shown in FIG. 1, FIG. 16 is a top view for explaining the operation (the orientation of the image) of the image forming apparatus shown in FIG. 1. In the following, for the convenience of description, the upper side is referred to as "top," the lower side as "bottom," right side as "right," and left side as "left" in FIG. 4, FIGS. 5A and 5B, FIG. 7A, and FIGS. 10A and 10B.

The image forming apparatus 1 shown in FIG. 1 is an apparatus which displays a predetermined image g such as a still image and a moving image (particularly, commercials and promotion videos) on a display surface 91 placed on the floor surface of a floor 9 within a construction such as a building, for example.

In the embodiment, the image forming apparatus 1 is provided such that the position of a drawing region 911 serving as a region in which the image g is displayed is changed depending on the moving state of a human H moving on the floor 9. For example, as shown in FIG. 1, Movement $M_G$ of the drawing region 911 is performed depending on movement $M_H$ of the human H so as to maintain the state in which the drawing region 911 is located at a predetermined position on the front side of the human H.

Thus, even while the human H is moving, the image g can be displayed at the position where the human H can easily see the image g.

Especially, the image forming apparatus 1 rotates the image g and the drawing region 911 with their positions near the centers used as rotation axes to change the orientations of the image g and the drawing region 911 so as to allow the human H to see the image g easily.

From the above, the image forming apparatus 1 can provide an excellent advertising function, for example when images for advertising such as commercials and promotion videos are used as the display image.

The display surface 91 serving as an object on which the image g is displayed may be the floor surface of the floor 9 or may be the surface of a screen laid on the floor surface of the floor 9. When the surface of the screen laid on the floor surface of the floor 9 is used as the display surface 91, the display surface 91 can be provided with optical properties suitable for displaying the image g. Thus, the visibility of the image can be improved regardless of the material or the like of the site where the image is displayed (the floor in the embodiment). The constituent material of such a screen is not limited particularly, and examples thereof include polyethylene, polypropylene, polyvinyl chloride, polystyrene, polyamide, acrylic resin, ABS resin, fluororesin, epoxy resin, silicone resin, or copolymer, blend, polymer alloy or the like formed mainly of the above-mentioned materials, and one or two or more of them can be used in combination.

As shown in FIG. 2, the image forming apparatus 1 is formed of a projector 2 which scans the display surface 91 with light and displays (draws) an image thereon, a sensing portion 7 sensing the presence or absence and the moving state of a human near the display surface 91, and a control portion 8 controlling the driving of the projector 2 based on the sense result of the sensing portion 7. The image forming apparatus 1 also has a housing 11, and the projector 2 is accommodated in the housing 11 (see FIG. 1).

Since the image forming apparatus 1 as described above employs the projector 2 of optical scanning type to display the image, the apparatus is inexpensive and easily installed as compared with one using a flat panel display such as an LED panel, a liquid crystal panel, and an organic EL panel.

In the following, the components constituting the image forming apparatus 1 will be described successively in detail.

Projector

The projector 2 will be described first.

The projector 2 is configured to display the image g in the drawing region 911 formed in the display surface 91 through the scanning with light and to allow a change in position of the drawing region 911.

Specifically, as shown in FIG. 2, the projector 2 has a light source unit (light emitting portion) 3 which emits light, an optical scanning portion 4 which scans the display surface 91 with the light emitted from the light source unit 3, an activation control apparatus 5 which controls the light source unit 3 and the optical scanning portion 4, and a drawing position changing portion 6 changing the position of the drawing region 911.

Light Source Unit (Light Emitting Portion)

As shown in FIG. 3, the light source unit 3 has laser light sources 31r, 31g, and 31b for respective colors, and collimator lenses 32r, 32g, and 32b and dichroic mirrors 33r, 33g, and 33b provided in correspondence with the laser light sources 31r, 31g, and 31b for respective colors, respectively.

The laser light sources 31r, 31g, and 31b for respective colors have driving circuits 310r, 310g, and 310b, and a light source 320r for red color, a light source 320g for green color, and a light source 320b for blue color, respectively, (see FIG. 6), to emit laser light RR, GG, and BB of red color, green color, and blue color, respectively, as shown in FIG. 3. The laser light RR, GG, and BB are emitted in the state in which they are modulated in response to driving signals transmitted from a light source modulating portion 54, later described, of the activation control apparatus 5, and are collimated by the collimator lenses 32r, 32g, and 32b serving as collimating optical elements into thin beams, respectively.

The dichroic mirrors 33r, 33g, and 33b have the characteristics of reflecting the laser light RR of red color, the laser light GG of green color, and the laser light BB of blue light, respectively, and combine the laser light RR, GG, and BB of the respective colors into one and apply the one laser light (light) LL.

It should be noted that collimator mirrors may be used instead of the collimator lenses 32r, 32g, and 32b. In this case, a thin beam of collimated pencil of light can also be formed. When a collimated pencil of light is emitted from each of the laser light sources 31r, 31g, and 31b for the respective colors, the collimator lenses 32r, 32g, and 32b can be omitted. The laser light sources 31r, 31g, and 31b can be replaced with light sources such as light-emitting diodes which produce similar pencils of light. The order of the laser light sources 31r, 31g, and 31b for the respective colors, the collimator lenses 32r, 32g, and 32b, and the dichroic mirrors 33r, 33g, and 33b in FIG. 3 is merely illustrative, the order thereof can be freely set with the combinations of the respective colors maintained (the laser light source 31r, the collimator lens 32r, and the dichroic mirror 33r for the red color, the laser light source 31g, the collimator lens 32g, and the dichroic mirror 33g for the green color, the laser light source 31b, the collimator lens 32b, and the dichroic mirror 33b for the blue color). For example, the combination of the blue color, the red color, and the green color is possible in order of decreasing proximity to the optical scanning portion 4.

Since the light source unit 3 as described above emits laser light, the light source unit 3 is focus free, the proximate projection can be performed, and the projection position can be set at an arbitrary position without being limited by the installation position. In addition, since the use of the laser light can simplify an optical system such as lenses for providing collimated light, it is possible to reduce the size of the light source unit 3, and thus the size of the image forming apparatus 1.

Optical Scanning Portion

Next, the optical scanning portion 4 will be described.

The optical scanning portion 4 scans the display surface 91 (horizontal scanning: main scanning) in a horizontal direction (first direction) with the laser light LL emitted from the light source unit 3 and scans the display surface 91 (vertical scanning: sub-scanning) in a vertical direction (second direction orthogonal to the first direction) at a scanning speed lower than the scanning speed in the horizontal direction, thereby performing two-dimensional scanning.

The optical scanning portion 4 has an optical scanner (first direction scanning portion) 41 which is a horizontal scanning mirror for scanning the display surface 91 with the laser light LL emitted from the light source unit 3 in the horizontal direction, an angle detecting portion (behavior detecting means) 43 detecting the angle (behavior) of a movable plate 411a, later described, of the optical scanner 41, an optical scanner (second direction scanning portion) 42 which is a vertical scanning mirror for scanning the display surface 91 with the laser light LL emitted from the light source unit 3 in the vertical direction, and an angle detecting portion (behavior detecting means) 44 detecting the angle (behavior) of a movable plate 421a, later described, of the optical scanner 42.

In the following, the configurations of the optical scanners 41 and 42 will be described. Since the optical scanners 41 and 42 have the similar configurations, the optical scanner 41 will hereinafter be described as a representative, and the description of the optical scanner 42 is omitted.

As shown in FIG. 4, the optical scanner 41 is of a so-called one-degree-of-freedom vibration system (one dimensional scanning), and has a base body 411, an opposite substrate 413 provided opposite to a lower surface of the base body 411, and a spacer member 412 provided between the base body 411 and the opposite substrate 413.

The base body 411 has the movable plate 411a, a support portion 411b which supports the movable plate 411a to be turnable, and a pair of coupling portions 411c and 411d which couples the movable plate 411a to the support portion 411b.

The movable plate 411a has a generally rectangular shape in plane view. A light reflecting portion (mirror) 411e having light reflectivity is provided on an upper surface of such a movable plate 411a. A surface (upper surface) of the light reflecting portion 411e forms a reflecting surface which reflects light. The light reflecting portion 411e is formed of a metal film of Al, Ni or the like, for example. A permanent magnet 414 is provided on a lower surface of the movable plate 411a.

The support portion 411b is provided to surround the outer periphery of the movable plate 411a in plane view of the movable plate 411a. Specifically, the support portion 411b has a frame shape within which the movable plate 411a is located.

The coupling portion 411c couples the movable plate 411a to the support portion 411b on the left side of the movable plate 411a, and the coupling portion 411d couples the movable plate 411a to the support portion 411b on the right side of the movable plate 411a.

Each of the coupling portions 411c and 411d has a long shape. Each of the coupling potions 411c and 411d is elastically deformable. Such a pair of coupling portions 411c and 411d is provided coaxially, and the movable plate 411a is turned relative to the support portion 411b about the axis (hereinafter referred to as a "turning central axis J1").

The base body 411 as described above is formed of silicon used as the main material, for example, and the movable plate 411a, the support portion 411b, and the coupling portions 411c and 411d are formed integrally. The use of silicon as the main material can realize excellent turning characteristics and can achieve excellent durability. Since the silicon can be microfabricated, the formation of the base body 411 from the silicon used as the main material can provide high dimension accuracy of the base body 411 to achieve excellent vibration characteristics of the optical scanner 41. In addition, the optical scanner 41 can be reduced in size.

The spacer member 412 has a frame shape, and its upper surface is bonded to the lower surface of the base body 411. The spacer member 412 is substantially equal in shape to the support portion 411b in plane view of the movable plate 411a. The spacer member 412 as described above is formed of various types of glass, various types of ceramics, silicon, and $SiO_2$, for example.

It should be noted that the bonding method of the spacer member 412 to the base body 411 is not limited particularly, and for example, the bonding may be performed through a different member such as an adhesive, or direct bonding or anode bonding may be used depending on the constituent material of the spacer member 412 or the like.

The opposite substrate 413 is formed of various types of glass, silicon, or $SiO_2$, for example, similarly to the spacer member 412. A coil 415 is provided on an upper surface of the opposite substrate 413 and at a site opposite to the movable plate 411a.

The permanent magnet 414 has a plate rod shape and is provided along the lower surface of the movable plate 411a. The permanent magnet 414 as described above is magnetized (polarized) in a direction orthogonal to the turning central axis J1 in plane view of the movable plate 411a. Specifically, the permanent magnet 414 is provided such that the line segment connecting both poles (south pole and north pole) is orthogonal to the turning central axis J1.

For the permanent magnet 414 as described above, it is possible to use neodymium magnet, ferrite magnet, samarium cobalt magnet, alnico magnet or the like, for example, without particular limitation.

The coil 415 is provided to surround the outer periphery of the permanent magnet 414 in plane view of the movable plate 411a.

The optical scanner 41 has a voltage applying portion 416 which applies a voltage to the coil 415. The voltage applying portion 416 is formed to allow the adjustment (change) of conditions including the voltage value and the frequency of the applied voltage. The voltage applying portion 416, the coil 415, and the permanent magnet 414 constitute a driving portion 417 turning the movable plate 411a.

A predetermined voltage is applied to the coil 415 by the voltage applying portion 416 and a predetermined electric current passes therethrough.

For example, when an alternating voltage is applied to the coil 415 by the voltage applying portion 416, an electric current passes accordingly to produce a magnetic field in the thickness direction (up-down direction in FIG. 4) of the movable plate 411*a* and the direction of the magnetic field is switched periodically. Specifically, switching is performed between a state A in which the portion of the coil 415 near the upper side thereof is the south pole and the portion near the lower side thereof is the north pole and a state B in which the portion of the coil 415 near the upper side thereof is the north pole and the portion near the lower side is the south pole. At this point, the driving of the voltage applying portion 416 is controlled by the activation control apparatus 5, later described.

In the state A, as shown in FIG. 5A, the right-side portion of the permanent magnet 414 is displaced upward by repulsion to the magnetic field produced by the passage of the electric current through the coil 415, and the left-side portion of the permanent magnet 414 is displaced downward by attraction to the magnetic field. This turns and inclines the movable plate 411*a* counterclockwise.

On the other hand, in the state B, as shown in FIG. 5B, the right-side portion of the permanent magnet 414 is displaced downward and the left-side portion of the permanent magnet 414 is displaced upward. This turns and inclines the movable plate 411*a* clockwise.

The state A and the state B as described above are repeated alternatively to turn (vibrate) the movable plate 411*a* about the turning central axis J1 while torsionally deforming the coupling portions 411*c* and 411*d*.

With the control of the activation control apparatus 5, later described, the voltage applied to the coil 415 by the voltage applying portion 416 is adjusted to allow the adjustment of the passing electric current. This can adjust the swing angle (amplitude) of the turning of the movable plate 411*a* (the reflecting surface of the light reflecting portion 411*e*) about the turning central axis J1.

The configuration of the optical scanner 41 as described above is not limited particularly as long as it can turn the movable plate 411*a*, and for example, the configuration may have a two-degree-of-freedom vibration system. In addition, the driving scheme of the optical scanner 41 may be piezoelectric driving using a piezoelectric element, electrostatic driving using electrostatic attraction or the like, instead of the electromagnetic driving using the coil 415 and the permanent magnet 414.

As shown in FIG. 3, the optical scanners 41 and 42 as configured above are provided such that their turning central axes J1 and J2 have the directions orthogonal to each other. The provision of the optical scanners 41 and 42 as described above allows the display surface 91 to be scanned two-dimensionally (in the two directions orthogonal to each other) with the laser light LL emitted from the light source unit 3. As a result, a two-dimensional image can be drawn onto the display surface 91 with the relatively simple configuration.

Specifically, the light emitted from the light source unit 3 is reflected by the reflecting surface of the light reflecting portion 411*e* of the optical scanner 41 and then is reflected by a reflecting surface of a light reflecting portion 421*e* of the optical scanner 42 and is projected (applied) to the display surface 91. At this point, the light reflecting portion 411*e* of the optical scanner 41 is turned, and the light reflecting portion 421*e* of the optical scanner 42 is turned at the angular velocity (speed) lower than the angular velocity of the turning of the light reflecting portion 411*e*. This realizes the scanning of the display surface 91 in the horizontal direction and in the vertical direction at the lower scanning speed than the scanning speed in the horizontal direction with the laser light LL emitted from the light source unit 3. In this manner, the display surface 91 is scanned two-dimensionally with the laser light LL emitted from the light source unit 3 and the image is drawn on the display surface 91.

To turn the light reflecting portion 421*e* of the optical scanner 42 at the lower angular velocity than the angular velocity of the light reflecting portion 411*e* of the optical scanner 41, for example, the optical scanner 41 may be resonance driven using resonance and the optical scanner 42 may be non-resonance driven not using resonance. When both of the optical scanners 41 and 42 are resonance driven, the optical scanners 41 and 42 may be designed such that the resonance frequency of the optical scanner 41 (the resonance frequency of the vibration system composed of the movable plate 411*a* and the coupling portions 411*c* and 411*d*) is higher than the resonance frequency of the optical scanner 42.

The light emitted from the light source unit 3 may be reflected by the light reflecting portion 421*e* of the optical scanner 42 first and then is reflected by the light reflecting portion 411*e* of the optical scanner 41. In other words, the configuration may be provided such that the vertical scanning is performed first and the horizontal scanning is performed next.

Next, description will be made of the angular detecting portion 43 detecting the angle of the movable plate 411*a* of the optical scanner 41. Since the angular detecting portion 44 detecting the angle of the movable plate 421*a* of the optical scanner 42 has the similar configuration as that of the angular detecting portion 43, the description thereof is omitted.

As shown in FIG. 4, the angular detecting portion 43 has a piezoelectric element (piezoresistance element) 431 provided on the coupling portion 411*c* of the optical scanner 41, an electromotive force detecting portion 432 which detects the electromotive force produced from the piezoelectric element 431, and an angular sensing portion 433 which determines the angle (senses the behavior) of the movable plate 411*a* based on the detection result of the electromotive force detecting portion 432.

As the coupling portion 411*c* is torsionally deformed in association with the turning of the movable plate 411*a*, the piezoelectric element 431 is deformed accordingly. The piezoelectric element 431 has the property in which, when it is deformed from the natural state with no external force applied, it produces the electromotive force of the magnitude in accordance with the deformation amount (the property in which the resistance value is changed). Thus, the angle sensing portion 433 determines the degree of the torsion of the coupling portion 411*c* based on the magnitude of the electromotive force (or the resistance value) detected by the electromotive force detecting portion 432, and determines the angle of the movable plate 411*a* (the reflecting surface of the light reflecting portion 411*e*) from the degree of the torsion. In addition, the angle sensing portion 433 determines the swing angle of the movable plate 411*a* about the turning central axis J1. A signal including the information of the angle and the swing angle of the movable plate 411*a* is transmitted from the angle sensing portion 433 to the activation control apparatus 5.

The reference (0°) of the detected angle of the movable plate 411*a* may be in any state of the optical scanner 41. For example, the reference can be set when the optical scanner 41 is in the initial state (in the state in which no voltage is applied to the coil 415).

The detection of the angle of the movable plate 411a may be performed in real time (continuously), or may be performed intermittently. The angle detecting portion 43 is not limited to the one using the piezoelectric element as in the embodiment as long as the angle of the movable plate 411a can be detected, and for example, an optical sensor may be used.

Since the optical scanning portion 4 as described above has the optical scanners 41 and 42 as described before, the image forming apparatus 1 can be realized with the small size and the simple configuration.

Activation Control Apparatus

Next, the activation control apparatus 5 will be described.

In displaying (drawing) the image on the display surface 91 by using the pair of optical scanners 41 and 42 as described above in the above-mentioned projector 2, distortion occurs due to a difference in the optical path length to the display surface 91, for example, distortion called "trapezoidal distortion" occurs which represents a difference in the length in the lateral direction (horizontal direction) between on the upper side and the lower side of the image displayed on the display surface 91.

When the position of the drawing region 911 or a drawable region 912 is changed as later described, at least one of the position (orientation), the shape, and the area (dimension) of the image g or the drawing region 911 displayed on the display surface 91 is distorted.

The activation control apparatus 5 has the function of correcting the distortion of the image g or the drawing region 911 as described above.

Thus, the image with its distortion corrected can be displayed on the display surface 91. This can display the image having the desired contents easily recognized by the human.

Particularly, the activation control apparatus 5 provides changing portion changing the orientation of the image g by rotating the image g formed on the display surface 91 with a portion near the center used as the rotation axis.

Through the use of the activation control apparatus 5, the orientation of the image g is set in the orientation in which the human can easily see it. The contents of the image g can be recognized readily by the human.

The activation control apparatus 5 will hereinafter be described.

As shown in FIG. 6, the activation control apparatus 5 has a video data storing portion (video data storing unig) 51 which stores video data (image data) used in drawing an image, a video data computing portion 52, a drawing timing producing portion 53, a light source modulating portion (light modulating portion) 54, a swing angle computing portion (amplitude computing portion) 55, an angle indicating portion 56, and a calibration line storing portion (calibration line storing unig) 57 which stores a calibration line.

In the activation control apparatus 5 as described above, when video data is input to the image forming apparatus 1, the input video data is temporarily stored in the video data storing portion 51, and the video data read from the video data storing portion 51 is used to perform the drawing of an image. In this case, the drawing of the image may be started after all of the video data is stored in the video data storing portion 51, or the drawing of the image may be started after part of the video data is stored in the video data storing portion 51, and the subsequent video data may be stored in the video data storing portion 51 in parallel with the drawing of the image.

For starting the drawing of the image after part of the video data is stored in the video data storing portion 51, at least one frame, or preferably two or more frames of the video data (for example, two frames) are first stored in the video data storing portion 51, and then the drawing of the image is started. The reason is as follows. The image forming apparatus 1 performs the horizontal scanning in each of a go path and a return path of the vertical scanning to draw the image (hereinafter also referred to simply as "go and return drawing in the vertical direction"). As described later, the reading of the video data from the video data storing portion 51 for the drawing of the image in the go path of the vertical direction is performed in reverse order to the reading for the drawing of the image in the return path of the vertical scanning. To read the video data from the opposite side in starting the drawing of the image in the return path of the vertical path, at least one frame of the video data for use in the drawing of the image in the return path needs to be stored in the video data storing portion 51. In addition, in order to perform the rotation processing of the video data for each frame or to change the reading order of the video data for each pixel in rotating the drawing region 911 and the image g within the drawable region 913 as later described, at least one frame of the video data needs to be stored in the video data storing portion 51.

The video data storing portion 51 may have the function of storing the corrected video data after the video data is subjected to the rotation processing for each frame or the reading order of the video data for each pixel is changed. In this case, the corrected data stored in the video data storing portion 51 can be read sequentially and the drawing can be performed.

In the drawing timing producing portion 53, drawing timing information and drawing line information are produced. The drawing timing information is sent to the video data computing portion 52, and the drawing line information is sent to the video data computing portion 52 and the swing angle computing portion 55.

The drawing timing information includes information of the timing in which the drawing is performed, or the like. The drawing line information includes information of the position in the vertical direction of a drawing line L for the drawing (the angle of the movable plate 421a), or the like. The position of any site of the drawing line L may be set to the position in the vertical direction of the drawing line L, and for example, the left-side end, the right-side end, the center or the like can be used.

The video data computing portion 52 reads the video data from the video data storing portion 51 and performs various types of correction computing including the distortion correction and the rotation processing on the video data based on the drawing timing information and the drawing line information input from the drawing timing producing portion 53, moving direction information of the human input from the sensing portion 7, and turning angle information input from a unit turning mechanism 61, and sends brightness data for each color to the light source modulating portion 54 based on the computing result. The rotation processing of the video data is later described.

The light source modulating portion 54 performs the modulation of the light sources 320r, 320g, and 320b through the driving circuit 310r, 310g, and 310b, respectively, based on the brightness data for each color input from the video data computing portion 52. Specifically, the light source modulating portion 54 turns on/off or adjusts (increases or reduces) the output of each of the light sources 320r, 320g, and 320b.

The angle detecting portion 43 on the side of the optical scanner 41 detects the angle and the swing angle of the movable plate 411a, and sends the information of the angle and the swing angle (the angle information of the movable plate 411a) to the drawing timing producing portion 53 and the swing angle computing portion 55 of the activation control apparatus 5. The angle detecting portion 44 on the side of the optical scanner 42 detects the angle of the movable plate 421a and the sends the information of the angle (the angle information of the movable plate 421a) to the angle indicating portion 56 of the activation control apparatus 5.

When the drawing of the current drawing line L is ended and the information of the swing angle of the movable plate 411a is input from the angle detecting portion 43, the drawing timing producing portion 53 sends, in synchronization therewith, target angle information (angle indication) which indicates a target angle of the movable plate 421a when the laser light LL is applied to a drawing start point of the drawing line L for the next drawing. The target angle of the movable plate 421a is set such that the adjacent drawing start points have fixed intervals between them in the vertical direction. The angle indicating portion 56 compares the angle of the movable plate 421a detected by the angle detecting portion 44 with the target angle of the movable plate 421a, performs correction so as to eliminate the difference, and sends the driving data to the driving portion 427 of the optical scanner 42.

The driving portion 427 drives the optical scanner 42 (applies the voltage to the coil) based on the driving data. Thus, when the laser light LL is applied to the drawing start point, the angle of the movable plate 421a is at the target angle.

In the embodiment, the angular velocity of the movable plate 421a may be fixed from the drawing start point to the drawing end point in each drawing line L and the scanning speed in the vertical direction with the laser light LL may be fixed. Alternatively, the angular velocity of the movable plate 421a may be gradually changed and the scanning velocity in the vertical direction with the laser light LL may be gradually changed.

The drawing timing producing portion 53 sends the drawing line information, that is, the information of the position in the vertical direction of the drawing line L for the next drawing to the swing angle computing portion 55.

The swing angle computing portion 55 uses the calibration line read from the calibration line storing portion 57 and determines a target swing angle of the movable plate 411a in the drawing line L for the next drawing based on the information of the position in the vertical direction of the drawing line L for the next drawing input from the drawing timing producing portion 53. Then, based on the information of the swing angle of the movable plate 411a input from the angle detecting portion 43 and the target swing angle of the movable plate 411a, the swing angle computing portion 55 sends the driving data to the driving portion 417 of the optical scanner 41 so that the swing angle of the movable plate 411a becomes equal to the target swing angle.

In the calibration line storing portion 57, the calibration lines are stored such as the table and the computing expressions (functions) showing the relationship between the position of the laser light LL in the vertical direction on the display surface 91 in the scanning of the display surface 91 (the position of the drawing line L in the vertical direction) and the swing angle of the movable plate 411a such that the amplitude of the laser light LL in the light emitting state is constant along the vertical direction. In drawing the image, the calibration line is used, and based on the position of the laser light LL in the vertical direction on the display surface 91 in the scanning of the display surface 91, the target value of the swing angle (target swing angle) is determined. The calibration line can be determined through calculations and is stored previously in the calibration line storing portion 57.

The driving portion 417 applies, based on the driving data, the effective voltage of the same frequency as the resonance frequency of the optical scanner 41 to the coil 415 to pass an electric current, produces a predetermined magnetic field, and changes the magnitude of the effective current and the phase difference in the optical scanner 41 and the driving waveform, thereby supplying energy to the optical scanner 41, or conversely, taking energy from the optical scanner 41. Thus, the swing angle of the movable plate 411a in resonance motion becomes equal to the target swing angle. In this manner, based on the information (the detection result) of the swing angle of the movable plate 411a detected by the angle detecting portion 43 and the target swing angle (target value), the swing angle of the movable plate 411a is adjusted such that the swing angle of the movable plate 411a is equal to the target swing angle, and at the same time, each drawing line L of the drawing region 911 is scanned sequentially with the laser light LL to draw the image.

More specifically, the projector 2 performs the scanning in the vertical direction (hereinafter also referred to simply as "vertical scanning") in each of the go path and the return path, and in each of the go path and the return path of the vertical scanning, performs scanning in the horizontal direction (hereinafter also referred to simply as "horizontal scanning") in each of the go path and the return path to display (draw) the image on the display surface 91.

In performing the horizontal scanning, the projector 2 is configured to adjust the swing angle of the movable plate 411a such that the amplitude in the horizontal direction of the laser light LL on the display surface 91 (hereinafter also referred to simply as "the amplitude of the laser light (light) LL") in the light emitting state in which the laser light LL is emitted from the light source unit 3 (hereinafter also referred to simply as "the light emitting state") is constant along the vertical direction as compared with the case the adjustment (the adjustment by adjusting unig) of the swing angle is not performed with the turning central axis J1 of the movable plate 411a used as the center (hereinafter also referred to simply as "the swing angle of the movable plate 411a"). Especially, it is preferable to employ the configuration in which the swing angle of the movable plate 411a is adjusted such that the amplitude of the laser light LL in the light emitting state is constant along the vertical direction. This can prevent the trapezoidal distortion of the image while increasing the time aperture ratio. In the embodiment, description will be made of the case where the adjustment is performed such that the amplitude is constant along the vertical direction as a representative.

The amplitude (scanning range) refers to the distance (interval) in the horizontal direction between the position of the laser light LL on the same plane as the display surface 91 when the movable plate 411a is turned clockwise (in a predetermined direction) to the maximum angle in the light emitting state and the position of the laser light LL on the same plane as the display surface 91 when the movable plate 411a is subsequently turned counterclockwise (in the direction opposite to the above-mentioned direction) to the maximum angle, that is, the length in the horizontal direction of each of the plurality of drawing lines (scanning lines) L which are the tracks of the laser light LL on the display surface 91 when the display surface 91 is scanned two-dimensionally with the laser light LL in the light emitting state as shown in FIGS. 7A and 7B.

As shown in FIGS. 7A and 7B, the plurality of drawing lines L are placed in a zigzag pattern. Each of the left-side end portion and the right-side end portion of each of the drawing lines L is not appropriate for the drawing since the light reflecting portion 411e of the optical scanner 41 is at a small angular velocity (speed). For this reason, the region of the region formed by the plurality of drawing lines L except the left-side end portion and the right-side end portion is set to the drawable region 912 which is the region where the image can be displayed.

The drawing region 911 which is the region where the image is drawn (displayed) is set (see FIGS. 11A and 11B) within the drawable region 912, and a drawing rotation region 913 which is a region where the drawing region 911 can be set (rotatable within the drawable region 912 as later described) is set.

The drawing rotation region 913 has a circular shape and is set such that the diameter is substantially equal to the shorter one of the length in the horizontal direction and the length in the vertical direction of the drawable region 912 described above.

The drawing region 911 is set within the above-mentioned drawing rotation region 913. Especially, the drawing region 911 can be rotated within the drawing rotation region 913 and the rotation angle can be set arbitrarily, as later described.

In the embodiment, the drawing region 911 is set to have a rectangular shape (including a square shape). The drawing region 911 is set such that the center is coincident with the center of the drawing rotation region 913 and that the length of the diagonal line is equal to the diameter of the drawing rotation region 913. Thus, the drawing region 911 can be rotated within the drawing rotation region 913 while the shape and the area of the drawing region 911, later described, are held constant. It should be noted that the shape of the drawing region 911 is not limited to the above-mentioned rectangular shape, and for example, a circular shape, an elliptic shape, a triangular shape, a pentagonal shape or the like may be used.

When the swing angle of the movable plate 411a of the optical scanner 41 is constant, the amplitude of the laser light LL in the light emitting state is changed in accordance with the angle of the movable plate 421a of the optical scanner 42, and is longer as the position in the vertical direction on the display surface 91 scanned with the laser light LL (the position in the vertical direction of the drawing line L) is farther from the projector 2. The activation control apparatus 5 adjusts the swing angle of the movable plate 411a in accordance with the angle of the movable plate 421a. Specifically, the swing angle of the movable plate 411a is reduced as the position in the vertical direction on the display surface 91 scanned with the laser light LL (the position in the vertical direction of the drawing line L) is farther from the projector 2, so that the amplitude of the laser light LL in the light emitting state is held constant along the vertical direction.

In the image forming apparatus 1, the angle and the angular velocity of the movable plate 421a are preferably adjusted such that the adjacent ones of the odd-numbered drawing lines L from the top have fixed intervals (pitches) in the vertical direction and the adjacent ones of the even-numbered drawing lines L from the top have fixed intervals (pitches) in the vertical direction in the drawing region 911. This can prevent distortion in the vertical direction of the image.

In the embodiment, for example on the left-side end portion and the right-side end portion of the drawing region 911 at the start of the drawing of each of the drawing lines L, the angle of the movable plate 421a is adjusted such that the adjacent drawing lines L have fixed intervals in the vertical direction, and the angular velocity of the movable plate 421a is set to a predetermined value. Specifically, the angle of the movable plate 421a is adjusted such that the adjacent drawing start points have fixed intervals in the vertical direction for each of the drawing lines L, and the angular velocity of the movable plate 421a is set to the predetermined value for each of the drawing lines L. As the position in the vertical direction of the drawing line L is farther from the projector 2, the angular velocity of the movable plate 421a is set to a smaller value. This can prevent distortion in the vertical direction of the image through the relatively simple control.

The drawing timing producing portion 53 performs management of whether the drawing is to be performed in the odd-number frame (odd-numbered frame) or the even-number frame (even-numbered frame), and accordingly determines the turning direction (moving direction) of the movable plate 421a and the reading order of the video data from the video data storing portion 51. Specifically, the reading of the video data for the drawing of the image in the odd-numbered frame (the go-path of the scanning in the vertical direction) is performed in reverse order to the reading for the drawing of the image in the even-numbered frame (the return-path of the scanning in the vertical direction).

The same line on the display surface 91 is scanned with the laser light LL in the odd-numbered frame and the even-numbered frame. In other words, the scanning with the laser light LL is performed such that each of the drawing line L in the odd-numbered frame matches each of the drawing lines L in the even-numbered frame.

Specifically, for example as shown in FIGS. 7A and 7B, the drawing is started from top left and is performed in a zigzag pattern to bottom right in the first frame (odd-numbered frame). In the second frame (even-numbered frame), the turning direction of the movable plate 421a is reversed to the above, and the drawing is reversely performed from bottom right to top left. Subsequently, the drawing is performed from top left to bottom right in the odd-numbered frames and the drawing is performed from bottom right to top left in the even-numbered frames similarly.

While the go-path of the scanning in the vertical direction is set to the odd-numbered frame and the return-path of the scanning in the vertical direction is set to the even-numbered frame in the embodiment, the invention is not limited thereto. The return-path of the scanning in the vertical direction may be set to the odd-numbered frame and the go-path of the scanning in the vertical direction may be set to the even-numbered frame.

While the position where the drawing is started in the first frame is top left in the embodiment, the invention is not limited thereto. For example, that position may be top right, bottom left, bottom right or the like.

In addition, it is possible to scan different lines on the display surface 91 with the laser light LL between the odd-numbered frames and the even-numbered frames.

The swing angle of the movable plate 411a and the swing angle of the movable plate 421a in the drawing of the image are changed over time as described below.

As shown in FIG. 8, in the horizontal scanning, the swing angle of the movable plate 411a is gradually increased from the minimum angle and reaches the maximum angle, then is gradually reduced and reaches the minimum angle, is again increased gradually, and subsequently, the operation described above is repeated similarly. Since the swing angle of the movable plate 411a is not changed abruptly, the swing angle of the movable plate 411a of the optical scanner 41 in the form of operation using resonance can be adjusted easily and reliably. It should be noted that FIG. 8 shows the transitions of the maximum swing angle (amplitude) of the movable plate 411a for the convenience of description.

As shown in FIG. 9, in the vertical scanning, the swing angle of the movable plate 421a is gradually increased from the minimum angle and reaches the maximum angle, then is gradually reduced and reaches the minimum angle, is again increased gradually, and subsequently, the operation described above is repeated similarly. Since the swing angle of the movable plate 421a is not changed abruptly, the swing angle of the movable plate 421a of the optical scanner 42 can be adjusted easily and reliably. A non-display period (non-drawing period) in which the drawing of the image is not performed is provided between a display period (drawing period) in which the drawing of the image is performed in the odd-numbered frame (the go-path of the scanning in the vertical direction) and a display period in which the drawing of the image is performed in the even-numbered frame (the return-path of the scanning in the vertical direction). In the display period, each timing can be adjusted such as the timing in which the drawing of the next frame is started. FIG. 9 does not show the changes of the maximum swing angle (amplitude) of the movable plate 421a but shows the changes of the turning angle of the movable plate 421a for the convenience of description, and the maximum swing angle (amplitude) of the movable plate 421a is constant.

The drawing of the image is performed in both of the go-path and the return-path of the scanning in the vertical direction, that is, in the turning of the movable plate 421a in the predetermined direction and in the turning in the opposite direction thereto, so that any vertical retrace period as in the related art is not required and the non-display period can be shortened. This can enhance the time aperture ratio (the ratio of the period in which the drawing of the image is performed).

Specifically, since the non-display period in the vertical direction in one frame can be shortened by the go and return drawing, the vertical time aperture ratio can be increased. At the same angular velocity (speed) of the movable plate 411a as that when the image is drawn by performing the horizontal scanning only in the go path of the vertical scanning, the number of frames per unit time can be increased as compared with the case where the drawing of the image is performed only in the go path. Thus, quick movements in the moving image can be supported easily. Conversely, if the number of frames per unit time is the same as that when the image is drawn by performing the horizontal scanning only in the go path of the vertical scanning, the angular velocity of the movable plate 411a can be reduced as compared with the case where the drawing of the image is performed only in the go path, thereby making it possible to draw the image stably. When the angular velocity of the movable plate 411a is not changed in the above case, the drawing can be performed with a higher vertical resolution.

In reality, the movable plates 411a and 421a of the optical scanners 41 and 42 may have high inertia (inertial moment) and the movable plates 411a and 421a may not follow instantaneously. In such a case, for example, the driving current for the optical scanners 41 and 42 may be set to zero, or the optical scanners 41 and 42 may be driven in opposite phase (braking).

According to the activation control apparatus 5 as described above, the time aperture ratio can be enhanced and a trapezoidal distortion can be prevented without abruptly changing the swing angle of the movable plates 411a and 421a.

Since the horizontal scanning is performed to draw the image in each of the go path and the return path of the vertical scanning, any abrupt change of the swing angle of the movable plate 421a is not necessary in the switching from the go path to the return path or in the switching from the return path to the go path in the vertical scanning. This can adjust the swing angle of the movable plate 421a easily and reliably.

The shape or the like of the drawable region 912 is not limited to the above-mentioned one. For example, in the projector 2 shown in FIGS. 10A and 10B, the amplitude of the laser light LL in the light emitting state is not constant along the vertical direction, but the swing angle of the movable plate 411a is adjusted such that the amplitude of the laser light LL in the light emitting state is constant along the vertical direction as compared with the case where the adjustment of the swing angle of the movable plate 411a is not performed. This reduces the width on the upper side of the drawable region 912 in which the image can be drawn. The shape of the drawable region 912 is close to a rectangular shape (including a square shape), and it is possible to reduce the non-drawing region which is the region where the drawing is not performed.

In the projector 2, the drawable region 912 is set on the display surface 91. Within the drawable region 912, the drawing rotation region 913 which is the region where the drawing region 911 which is the region where the image is drawn (displayed) can be set (rotatable within the drawable region 912 as later described) is set.

Rotation Processing of Video Data

The rotation processing of the video data in the video data computing portion 52 described above will be described in detail.

As described earlier, in the embodiment, the drawing region 911 having the rectangular shape (including a square shape) is set such that the center is coincident with the center of the drawing rotation region 913 and that the length of the diagonal line is equal to the diameter of the drawing rotation region 913.

The activation control apparatus 5 allows the rotation of the drawing region 911 and the image g within the drawing rotation region 913 by using the center of the drawing region 911 or the drawing rotation region 913 as the rotation axis.

More particularly, the video data computing portion 52 of the activation control apparatus 5 performs the rotation processing of the video data stored in the video data storing portion 51 to perform the rotation of the drawing region 911 and the image g as described above.

In the embodiment, when the rotation processing of the video data is not performed in the video data computing portion 52, as shown in FIG. 11A, the up-down direction of the image g and the drawing region 911 formed on the display surface 91 extends in the vertical direction. In other words, the up-down direction of the image g and the drawing region 911 is in parallel with the central line of the horizontal scanning. The term "the central line of the horizontal scanning" refers to the line segment serving as the center of the amplitude in the horizontal scanning with the laser light LL (the line segment (straight line) passing through the center of the plurality of drawing lines L) (the same applies to the description below). While the embodiment is described, by way of example, in the case where the up-down direction of the image g is in parallel with the horizontal direction in the initial setting, the up-down direction of the image g in the initial setting (the orientation of the image g) is not limited thereto, and may extend in the vertical direction, or may extend in a direction inclined with respect to the horizontal direction and the vertical direction.

On the other hand, when the rotation processing of the video data is performed in the video data computing portion 52, as shown in FIG. 11B, the up-down direction of the image g and the drawing region 911 formed on the display surface 91 extends in a direction rotated (inclined) by a predetermined angle (rotation angle θ) with respect to the horizontal direction. In other words, the up-down direction of the image g and the drawing region 911 is in parallel with the direction rotated by the angle θ with respect to the central line of the horizontal scanning.

In such rotation processing, the following expressions (1) and (2) are satisfied where (CX, CY) represent the coordinates of the center (rotation center) of the image g and the drawing region 911, (X1, Y1) represent the coordinates of the image g and the drawing region 911 in the state shown in FIG. 11A (before the rotation processing), (X2, Y2) represent the coordinates of the image g and the drawing region 911 in the state shown in FIG. 11B (after the rotation processing), and θ represents the rotation angle (that is, the angle of the rotation processing) of the image g and the drawing region 911 from the state shown in FIG. 11A to the state shown in FIG. 11B.

$$X1=(X2-CX)\times\cos(\theta)-(Y2-CY)\times\sin(\theta)+CX \quad (1)$$

$$Y1=(X2-CX)\times\sin(\theta)+(Y2-CY)\times\cos(\theta)+CY \quad (2)$$

Based on the expressions (1) and (2), the video data computing portion 52 performs the rotation processing of the video data stored in the video data storing portion 51.

Such rotation processing is not limited particularly. For example, the processing can be performed by calculating the reading order of the video data for each pixel from the video data storing portion 51 based on the above expressions (1) and (2), and sequentially reading the video data for each pixel from the video data storing portion 51 based on the calculation results.

In addition to the above-mentioned one, such rotation processing may also be performed by producing video data after correction through known rotation processing for each frame of the video data stored in the video data storing portion 51 and using the video data after the correction.

In the embodiment, the rotation angle θ of the rotation processing in the video data computing portion 52 is determined on the basis of the movement direction information of the human input from the sensing portion 7, later described, and the rotation angle information input from the unit turning mechanism 61, later described. The rotation angle θ is described later.

As described above, since the activation control apparatus 5 has the function of performing the rotation processing of the video data, the image g can be rotated with the portion near the center as the rotation axis.

Especially, since the activation control apparatus 5 has the video data storing portion 51 which stores the video data, the video data computing portion 52 which has the function of performing the rotation processing of the video data stored in the video data storing portion 51, and the light source modulating portion 54 which drives the light source unit 3 based on the computing results of the video data computing portion 52 as described earlier, the video data can be subjected to the rotation processing sequentially to change the orientation of the image g.

Drawing Position Changing Portion

Next, the drawing position changing portion 6 will be described.

As shown in FIG. 3, the drawing position changing portion 6 has the unit turning mechanism 61 and a scanner turning mechanism 62.

The unit turning mechanism 61 has the function of turning the light source unit (light emitting portion) 3 and the optical scanning portion 4 described above together (as a unit). In the embodiment, the unit turning mechanism 61 turns the light source unit (light emitting portion) 3 and the optical scanning portion 4 to change the projection angle to move the drawing region 911 and the image g mainly in the direction of the horizontal scanning described above.

As shown in FIG. 12, the unit turning mechanism 61 has a support portion 611 which supports the light source unit 3 and the optical scanning portion 4 to be turnable and a motor 612 which turns the support portion 611.

The support portion 611 has an axis portion 613 with an axis line X1 as the central axis. The axis portion 613 is attached to an attachment portion 111 of the housing 11 through a bearing 614.

Thus, the light source unit 3 and the optical scanning portion 4 can be turned about the predetermined axis line X1 together with the support portion 611. The integral turning of the light source unit 3 and the optical scanning portion 4 can change the positions of the drawing region 911 and the image g without requiring the adjustment of the alignment of the light source unit 3 and the optical scanning portion 4.

In the embodiment, the predetermined axis line X1 is set along the vertical direction. Specifically, the unit turning mechanism 61 turns the light source unit 3 and the optical scanning portion 4 about the axis line orthogonal to the display surface 91. This can move the drawing region 911 and the image g in the direction of the horizontal scanning while suppressing distortion due to the change of the position of the drawing region 911. In such a case, if the image g is moved to the horizontal scanning without changing the orientation of the image g as later described, the relationship between the direction of the horizontal scanning and the orientation of the image g is displaced in association with the movement. However, such displacement can be corrected by changing the orientation of the image g as later described. As a result, the advantages of the application of the invention are significant in such a case.

The support portion 611 is provided with a first gear 615. The first gear 615 has a plurality of teeth aligned along the circumferential direction of the axis portion 613 (axis line X1).

On the other hand, the motor 612 has an axis portion 616 which rotates about the axis line. A second gear 617 which meshes with the above-mentioned first gear 615 is attached to the axis portion 616. The second gear 617 has a plurality of teeth aligned along the circumferential direction of the axis portion 616.

The motor 612 as described above is attached to the above-mentioned attachment portion 111 to rotate the second gear 617.

More specifically, as shown in FIG. 13A, the motor 612 rotates the second gear 617 counterclockwise to rotate the support portion 611 about the axis portion 613 clockwise. This can move the emitting direction of the laser light LL (that is, the position of the drawing region 911) toward the right side in FIG. 13A. On the other hand, as shown in FIG. 13B, the motor 612 rotates the second gear 617 clockwise to rotate the support portion 611 about the axis portion 613 counterclockwise. This can move the emitting direction of the laser light LL (that is, the position of the drawing region 911) toward the left side in FIGS. 13A and 13B.

Since the unit turning mechanism (unit turning portion) 61 as described above rotates the light source unit 3 and the optical scanning portion 4 together, it is possible to widen the range in which the display portion of the image g (the position of the drawing region 911) can be changed (the range in which the image g can be displayed). The alignment adjustment of the light source unit 3 and the optical scanning portion 4 does not need to be performed separately for changing the position of the drawing region 911, so that the design and the manufacture of the projector 2 can be facilitated. It should be noted that the unit turning mechanism (unit turning portion) 61 may rotate the light source unit 3 and the optical scanning portion 4 together not only about the axis line X1 but also about the axis line orthogonal to the axis line X1. In such a case, the drawing region 911 can be moved two-dimensionally even when the scanner turning mechanism 62 later described is omitted.

On the other hand, the scanner turning mechanism 62 has the function of turning the optical scanner 42 for the vertical scanning described earlier. In the embodiment, the scanner turning mechanism 62 turns the optical scanner 42 to move the drawing region 911 and the image g mainly in the direction of the vertical scanning described above.

As shown in FIG. 14, the scanner turning mechanism 62 has a support portion 621 which supports the optical scanner 42 for the vertical scanning described above and a motor 622 which turns the support portion 621.

The motor 622 has an axis portion 623 which rotates about the axis line. The support portion 621 is attached to the axis portion 623.

The motor 622 is attached (fixed) to the support portion 611 of the above-mentioned unit turning mechanism 61, although not shown.

The motor 622 turns the optical scanner 42 about the axis line of the axis portion 623 (specifically, the axis line coincident with the turning central axis J2) together with the support portion 621. This can move the emitting direction of the laser light LL (that is, the position of the drawing region 911) in the direction of the vertical scanning.

Since the scanner turning mechanism (scanner turning portion) 62 as described above turns the entire optical scanner 42 relative to the light source unit 3, it is possible to widen the range in which the display position of the image g (the position of the drawing region 911) can be changed (the range in which the image can be displayed). Especially, in the embodiment, the scanner turning mechanism 62 turns the optical scanner 42 on the front side in the traveling direction of the laser light LL of the optical scanners 41 and 42, so that it is possible to widen the range in which the position of the drawing region 911 can be changed relatively easily. It should be noted that the scanner turning mechanism (scanner turning portion) 62 may turn the optical scanner 42 not only about the turning central axis J2 but also about the axis line orthogonal to the turning central axis J2. In such a case, the above-mentioned unit turning mechanism 61 may be omitted. The scanner turning mechanism 62 may be configured to turn the optical scanner 41. In this case, since the range in which the drawing region 911 can be changed is limited by the area of the light reflecting portion 421e of the optical scanner 42, the area of the light reflecting portion 421e needs to be increased in order to widen that range.

As described above, the drawing position changing portion 6 can two-dimensionally change the position of the drawing region 911 onto the display surface 91.

The image forming apparatus 1 as described above includes the light source unit 3 and the optical scanning portion 4 as described earlier and uses the laser light, so that the image forming apparatus 1 is focus free, the proximate projection can be performed, and the position of the drawing region 911 can be adjusted at an arbitrary position without being limited to the installation position of the projector 2. Since the use of the laser light can omit or simplify the optical system such as lenses for providing collimated light, it is possible to reduce the size of the light source unit 3, and thus the size of the image forming apparatus 1.

Since the projector 2 employs the optical scanners 41 and 42 as described earlier, the configuration is relatively simple.

While the display surface 91 is placed on the floor surface of the floor 9 as described earlier in the embodiment, the projector 2 (housing 11) is placed on a wall surface W1 of a wall W orthogonal to the floor 9.

Thus, the optical path length of the light emitted from the projector 2 can be shortened, for example as compared with the case where the projector 2 is placed on a ceiling surface of a ceiling and the display surface 91 is placed on the floor surface of the floor 9. This can prevent or suppress the light emitted from the projector 2 from being blocked by a pedestrian or the like, for example. As a result, a desired image can be displayed on the display surface 91 without being affected by the surrounding environment (such as the density of population). In addition, since the placement surface of the projector 2 is the wall surface W1, it is possible to prevent or suppress the projector 2 from blocking the walking of a pedestrian or the like.

The placement of the projector 2 on the wall surface W1 and the placement of the display surface 91 on the floor surface of the floor 9 allow a human present around the image forming apparatus 1 to recognize the presence of the image easily within or outside the construction. For example when the image for advertising such as commercials and promotion videos is used as the display image, the excellent advertising function can be provided.

Sensing Portion

The sensing portion 7 has the function of sensing whether or not the human H is present within a sensing region S set near the display surface 91 and of sensing the moving state of the human H when the human H is present within the sensing region S (see FIG. 15).

As shown in FIG. 2, the sensing portion 7 has a human-detecting sensor 71, a storing portion 72, and a computing portion 73.

The human-detecting sensor 71 has the function of sensing whether or not the human H is present within the sensing region S and of sensing the position of the human H when the human H is present within the sensing region S.

The human-detecting sensor 71 described above is attached to the above-mentioned housing 11. While the human-detecting sensor 71 is attached to the housing 11 in the embodiment, the invention is not limited thereto, and the human-detecting sensor 71 may not be attached to the housing 11 but may be placed independently on the wall surface W1 or the like.

The human-detecting sensor 71 can sense the presence or absence of the human H near the human-detecting sensor 71, and can measure the spacing distance between the human-detecting sensor 71 and the sensed human H and the direction thereof.

The human-detecting sensor 71 described above is not limited particularly as long as the above-mentioned function can be provided. For example, it is possible to use one of an infrared-type sensor using infrared rays, an ultrasonic-type sensor using ultrasonic, a laser-type sensor (laser displacement meter) using laser light, a CCD image sensor and the like or two of them in combination.

As shown in FIG. 15, for the human-detecting sensor 71 described above, the sensing region S is set which is the region where the presence or absence and the position of the human are determined.

The sensing region S has a semicircular shape with the human-detecting sensor 71 located as the center when viewed from the vertical line direction (above).

The sensing region S is set to include the range in which the position of the drawing region 911 can be moved with the projector 2 when viewed from the vertical line direction (above). In the embodiment, the sensing region S is set to be substantially coincident with the range in which the position of the drawing region 911 can be moved with the projector 2 when viewed from the vertical line direction (above).

In the embodiment, the sensing region S is coincident with the effective sensing region of the human-detecting sensor 71 (the region in which the presence or absence of the human and the position and the direction of the presence can be sensed). The sensing region S may not be coincident with the effective sensing region of the human-detecting sensor 71, and it is only required that the sensing region S should be included within the effective sensing region of the human-detecting sensor 71. In this case, the sensing of whether or not the human is present within the sensing region S can be performed by making a determination based on the position and the direction of the human sensed by the human-detecting sensor 71, for example.

The position, the shape, and the size of the sensing region S are determined in accordance with the conditions such as the placement position of the projector 2, and the contents and the size of the displayed image, and are not limited particularly. For example, the shape of the sensing region S may be a rectangular shape, a square shape or the like.

In the human-detecting sensor 71 for which the sensing region S is set, when the human-detecting sensor 71 senses the presence of the human H, it is determined that the human H is present within the sensing region S. The determination result (whether or not the human H is present within the sensing region S) is transmitted to the activation control apparatus 5. Such a determination may be performed in real time (continuously), or may be performed intermittently.

When the human-detecting sensor 71 senses the presence of the human H, the sensor 71 computes the position of the human H based on the spacing distance between the human H and the human-detecting sensor 71 (hereinafter also referred to simply as "spacing distance L1"), and the direction of the line segment connecting the human-detecting sensor 71 to the human. Then, the computing result is transmitted to the storing portion 72 and the activation control apparatus 5.

The storing portion 72 has the function of storing the position sensed by the above-mentioned human-detecting sensor 71 as position information for each of predetermined periods. Such position information for each of predetermined periods can be used to compute the moving state of the human H (specifically, the moving direction and the moving speed).

The information stored in the storing portion 72 is input to the computing portion 73.

The computing portion 73 has the function of computing the moving direction and the moving speed of the human H based on the position information stored in the storing portion 72. Then, the computing portion 73 transmits the computing result (the moving direction and the moving speed of the human H) to the activation control apparatus 5. Such computing may be performed in real time (continuously) or may be performed intermittently.

The sensing portion 7 as described above senses the position, the moving direction, and the moving speed of the human H as the moving state of the human H. This enables the prediction of the movement of the human H. Thus, the image g can be displayed at a desired position for the moving human H.

Since the sensing portion 7 has the human-detecting sensor 71, the storing portion 72, and the computing portion 73 as described earlier, the position, the moving direction, and the moving speed of the human H can be sensed with the relatively simple and inexpensive configuration.

While the sensing portion 7 has been described above, the configuration of the sensing portion 7 is not limited to the above-mentioned configuration. For example, it is possible to use a single or a plurality of pressure sensors placed under the floor in the sensing region S.

The number of the human-detecting sensors 71 is not limited to one as in the embodiment and may be two or more.

Control Portion

The control portion 8 controls the driving of the projector 2 based on the sensing result of the above-mentioned sensing portion 7.

Especially, the control portion 8 controls the driving of the above-mentioned drawing position changing portion 6 based on the sensing result of the sensing portion 7. This can change the position of the image g depending on the moving state of the human H. This allows the human H to recognize the contents of the image g easily.

More particularly, when the human H enters the sensing region S, the control portion 8 determines that the human H is an object. While the human H who is the object is present within the sensing region S, the control portion 8 changes the position of the drawing region 911 in accordance with the position, the moving direction, and the moving speed of the human H.

When a plurality of humans enter the sensing region S, the control portion 8 may determine that the first one is the object. When a plurality of humans are present within the sensing region S, the one closest to the projector 2 may be determined as the object.

As shown in FIG. 15, when the human H is moving within the sensing region 5, the control portion 8 controls the driving of the projector 2 such that the position of the drawing region 911 is changed to remain located forward of the moving direction m of the human H. This causes the image g to be displayed on the front side of the moving human H, so that the moving human H can recognize the presence and the contents of the image g easily.

It is only required that the position of the drawing region 911 (central position) should be forward of the moving direction relative to the position of the human H (central position). When the moving direction m of the human H is used as a reference (0°), it is preferably located within the range from −60° to +60°, more particularly within the range from −45° to +45°, and more preferably within the range from −30° to +30°. This allows the presence and the contents of the image g to be recognized easily by the human H. In the following, description will be made of the case where the central position of the drawing region 911 is set on the line segment extending from the position (central position) of the human H toward the front of the moving direction of the human H.

The control portion 8 also controls the driving of the projector 2 such that the position of the drawing region 911 is continuously or intermittently changed in accordance with the movement of the human H. This allows the presence and the contents of the image g to be recognized easily by the moving human H.

The control portion 8 also controls the driving of the projector 2 such that the position of the drawing region 911 maintains a constant spacing distance to the position of the human H. This allows the moving human H to see the presence and the contents of the image g easily.

The spacing distance between the position (central position) of the drawing region 911 and the position (central position) of the human H may be a certain distance at which the human H can recognize the presence and the contents of the image g. The spacing distance depends on the area of the drawing region 911 and the like and is not limited particularly, but preferably ranges from 50 to 300 cm, and more preferably, ranges from 70 to 200 cm. This allows the presence and the contents of the image g to be recognized easily by the human H.

In contrast, when the spacing distance is smaller than the above-mentioned lower limit value, the image may go out of sight of the human if the moving speed of the human is high or the like. On the other hand, when the spacing distance exceeds the above-mentioned upper limit value, it is difficult for the human to recognize the presence and the contents of the image if the drawing region 911 or the image g is small or the like.

As described above, the control portion 8 controls the drawing position changing portion 6 in accordance with the movement of the human H to set the position of the drawing region 911 at the position where the human H can easily see the image.

Determination of Rotation Angle in Rotation Processing of Video Data

Then, detailed determination will be made of the determination (setting) of the rotation angle in the rotation processing with the above-mentioned activation control apparatus 5.

In accordance with the change of the image g and the drawing region 911 as described above, the above-mentioned video data computing portion 52 of the activation control apparatus 5 determines the rotation angle θ in the rotation processing of the video data described above (hereinafter also referred to simply as "rotation angle θ") based on the information of the human moving direction input from the above-mentioned sensing portion 7 and the turning angle information input from the above-mentioned unit turning mechanism 61.

More particularly, as shown in FIG. 16, assuming that the central position Pg of the drawing region 911 is set on the line segment extending from the position (central position) PH of the human H toward the front of the moving direction of the human H when the display surface 91 is viewed from above (in plane view), the rotation angle θ in the rotation processing is 180°−(α+β) where α represents the turning angle of the unit rotation mechanism 61 and β represents the angle between the line segment (straight line) LH passing through the human H and the center of the drawing region 911 and the central line L0 of the horizontal scanning when the turning angle of the unit turning mechanism 61 is zero.

The rotation angle θ is equal to an angle γ between the central line Lα of the amplitude in the horizontal direction when the turning angle of the unit rotation mechanism 61 is α and the line segment (straight line) LH passing through the human H and the center of drawing region 911.

The orientations of the image g and the drawing region 911 are set along the line segment (straight line) LH passing through the human H and the center Pg of the drawing region 911.

Since the activation control apparatus 5 changes the orientation of the image g based on the turning angle of the light source unit 3 and the optical scanning portion 4 with the unit turning mechanism 61 in this manner, the orientation of the image g can be changed relatively easily in accordance with the position of the image g.

As described above, the orientations of the drawing region 911 and the image g can be fixed relative to the orientation of the human H. Especially, in the embodiment, the orientation of the image g is set such that the top and bottom of the image g are in parallel with the moving direction of the human H. This allows the moving human H to see the contents of the image g easily.

Since the activation control apparatus 5 changes the orientation of the image g based on the activation state of the drawing position changing portion 6, the orientation of the image g can be changed in accordance with the position of the image g. Even when the position of the image g is changed in association with the change of the projection angle as described above, the orientation of the image g can be maintained in a predetermined state. As a result, the contents of the image g can be easily seen by the human H. In contrast, if the position of the image g is changed without changing the orientation of the image g, the orientation of the image g may be inclined with respect to the scanning direction of the laser light (the horizontal direction and the vertical direction) to make it difficult for the human H to see the contents of the image g.

Especially, the activation control apparatus 5 changes the orientation of the image g based on the activation state of the drawing position changing portion 6 and the sensing result of the sensing portion 7, so that the orientation of the image can be set to the orientation in which the human can see easily.

Since the activation control apparatus 5 changes the orientation of the image g to be fixed relative to the orientation of the human H, the human H easily sees the contents of the image g.

According to the image forming apparatus 1 of the embodiment as described above, the image g can be displayed at the position where the human H can easily see even when the human H moves. Thus, the presence and the contents of the image g can be recognized easily by the moving human H.

Embodiment 2

Next, embodiment 2 of the image forming apparatus according to the invention will be described.

Figure 17:
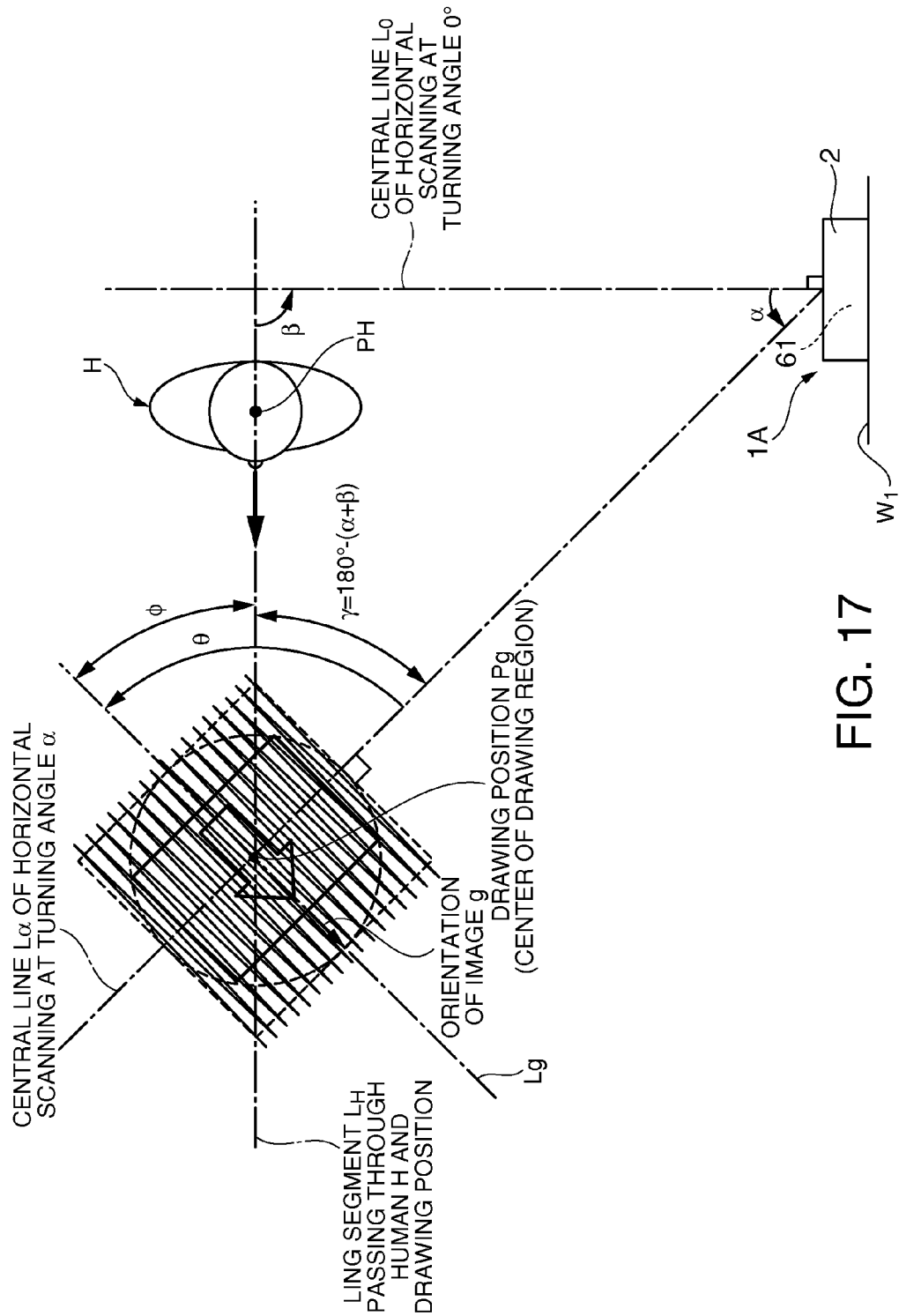
FIG. 17 is a top view for explaining the operation (the orientation of the image) of an image forming apparatus according to Embodiment 2 of the invention.

FIG. 17 is a top view for explaining the operation of the image forming apparatus (the orientation of the image) according to Embodiment 2 of the invention.

In the following, the image forming apparatus of Embodiment 2 will be described by focusing on different points from Embodiment 1 described earlier, and the description of similar points is omitted.

The image forming apparatus of Embodiment 2 is substantially similar to that of Embodiment 1 except for the method of setting the rotation angle θ of the image g and the drawing region 911. In FIG. 17, components similar to those in the above-mentioned embodiment are designated with the same reference numerals.

In the present embodiment, the orientations of the image g and the drawing region 911 are set to be inclined by a predetermined angle ϕ with respect to the orientation of the human H.

The predetermined angle ϕ may have a preset fixed value or may be a variable value which varies with the turning angle α of the unit turning mechanism 61, the sensing result of the human-detecting sensor 71 or the like.

More particularly, as shown in FIG. 17, assuming that the central position Pg of the drawing region 911 is set on the line segment extending from the position (central position) PH of the human H toward the front of the moving direction of the human H when the display surface 91 is viewed from above (in plane view), the rotation angle θ in the rotation processing is 180°−(α+β)+ϕ where α represents the turning angle of the unit rotation mechanism 61, β represents the angle between the line segment (straight line) LH passing through the human H and the center of the drawing region 911 and the central line L0 of the horizontal scanning when the turning angle of the unit turning mechanism 61 is zero, and ϕ represents the above-mentioned predetermined angle.

The rotation angle θ is equal to an angle provided by adding the angle ϕ to an angle γ between the central line Lα of the amplitude in the horizontal direction when the turning angle of the unit rotation mechanism 61 is α and the line segment (straight line) LH passing through the human H and the center of the drawing region 911.

In addition, the angle between the line segment Lg along the orientations of the image g and the drawing region 911 and the line segment (straight line) LH passing through the human H and the center Pg of the drawing region 911 is set to be φ.

As described above, the orientations of the drawing region 911 and the image g can be fixed relative to the orientation of the human H. Especially, the orientation of the image g can be set arbitrarily relative to the orientation of the human H. Thus, various advertising effects can be provided for the human H.

For example, the predetermined angle θ is varied depending on the turning angle α of the unit turning mechanism 61, the sensing result of the human-detecting sensor 71 or the like, so that the orientations of the image g and the drawing region 911 can be changed such that the human H is guided to a particular point.

Embodiment 2 as described above can also achieve the advantages similar to those in Embodiment 1 described above. Especially, since the orientations of the image g and the drawing region 911 can be set arbitrarily relative to the orientation of the drawable region 912 and the orientation of the human H, various advertising effects can be provided for the human H.

Embodiment 3

Next, Embodiment 3 of the image forming apparatus according to the invention will be described.

Figure 18:
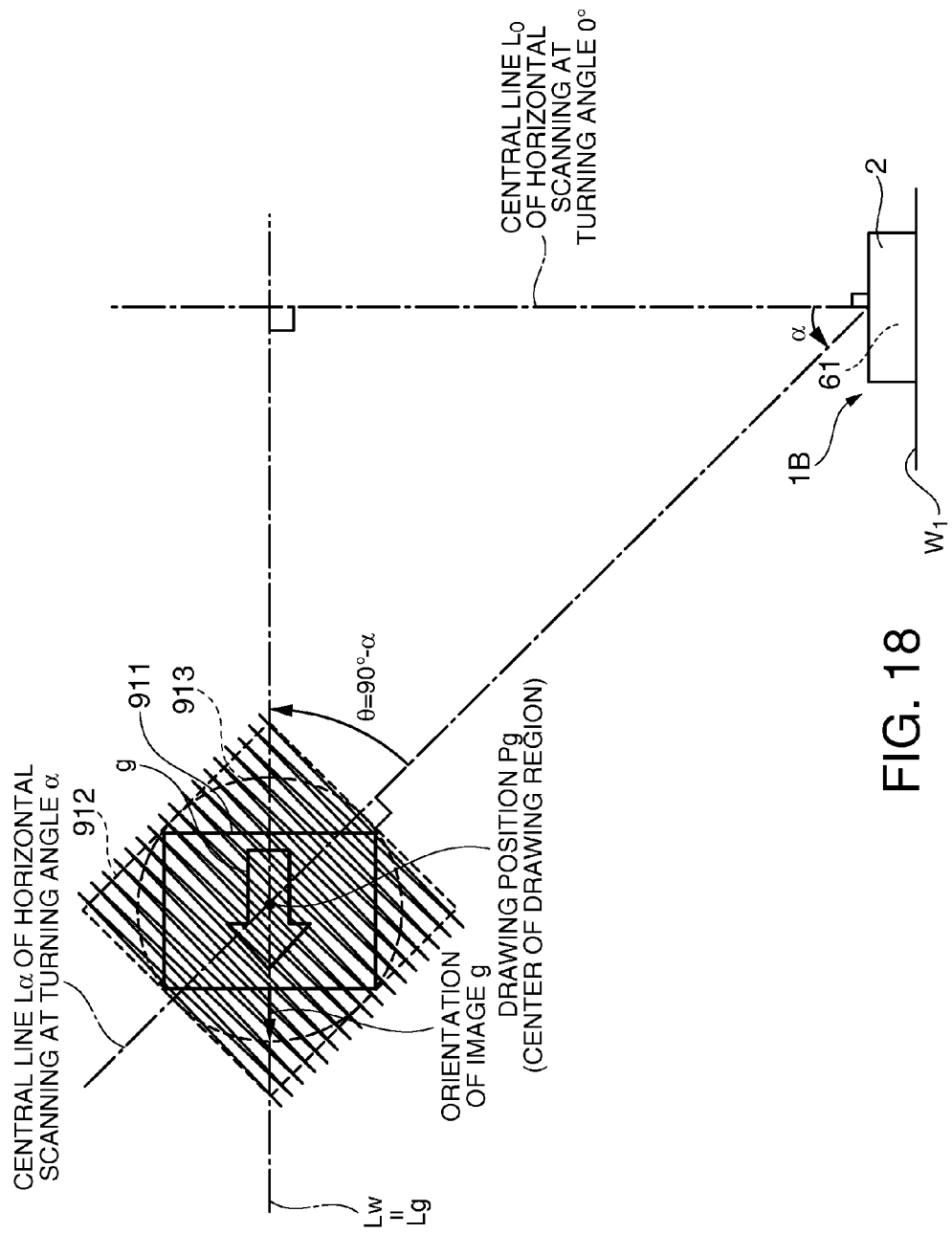
FIG. 18 is a top view for explaining the operation (the orientation of the image) of an image forming apparatus according to Embodiment 3 of the invention.

FIG. 18 is a top view for explaining the operation of the image forming apparatus (the orientation of the image) according to Embodiment 3 of the invention.

In the following, the image forming apparatus of Embodiment 3 will be described by focusing on different points from Embodiment 1 described earlier, and the description of similar points is omitted.

The image forming apparatus of Embodiment 3 is substantially similar to that of Embodiment 1 except for the method of setting the rotation angle θ of the image g and the drawing region 911. In FIG. 18, components similar to those of the above-mentioned embodiment are designated with the same reference numerals.

In the embodiment, the orientations of the image g and the drawing region 911 are set to be fixed relative to the wall surface W1 on which the projector 2 is placed.

More particularly, as shown in FIG. 18, the rotation angle θ in the rotation processing is 180°−α where α represents the turning angle of the unit rotation mechanism 61 when the display surface 91 is viewed from above (in plane view).

The rotation angle θ is equal to an angle between the central line Lα of the amplitude in the horizontal direction when the turning angle of the unit rotation mechanism 61 is α and the line segment (straight line) LW passing through the center of the drawing region 911 and in parallel with the wall surface W1.

A line segment Lg along the orientations of the image g and the drawing region 911 is set to be parallel with the line segment (straight line) LW passing through the center of the drawing region 911 and in parallel with the wall surface W1.

As described above, the orientations of the drawing region 911 and the image g can be fixed relative to the wall surface W1. Especially, in the embodiment, the top and bottom of the image g can be set in parallel with the wall surface W1. This can change the positions of the image g and the drawing region 911 while maintaining the fixed orientations (postures) of the image g and the drawing region 911 relative to the wall surface W1.

Embodiment 3 as described above can also provide the advantages similar to those in Embodiment 1 described before.

Embodiment 4

Next, Embodiment 4 of the image forming apparatus according to the invention will be described.

Figure 19:
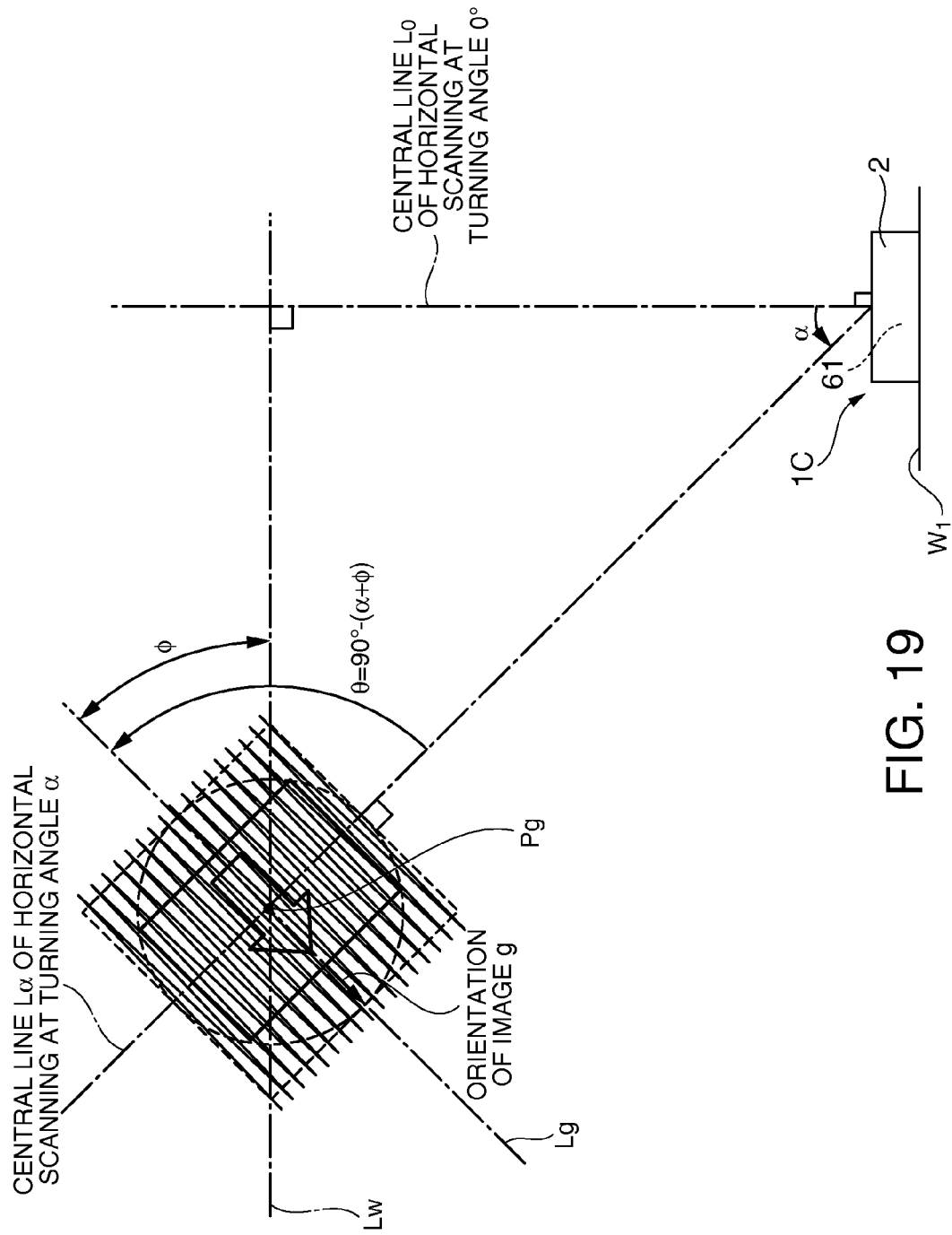
FIG. 19 is a top view for explaining the operation (the orientation of the image) of an image forming apparatus according to Embodiment 4 of the invention.

FIG. 19 is a top view for explaining the operation of the image forming apparatus (the orientation of the image) according to Embodiment 4 of the invention.

In the following, the image forming apparatus of Embodiment 4 will be described by focusing on different points from Embodiment 1 described earlier, and the description of similar points is omitted.

The image forming apparatus of Embodiment 4 is substantially similar to that of Embodiment 1 except for the method of setting the rotation angle θ of the image g and the drawing region 911. In FIG. 19, components similar to those of the above-mentioned embodiment are designated with the same reference numerals.

In the embodiment, the orientations of the image g and the drawing region 911 are set to be inclined by a predetermined angle φ with respect to the wall surface W1 on which the projector 2 is placed.

The predetermined angle φ may have a preset fixed value or may be a variable value which varies with the turning angle α of the unit turning mechanism 61, the sensing result of the human-detecting sensor 71 or the like.

More particularly, as shown in FIG. 19, the rotation angle θ in the rotation processing is 180°−α+φ where α represents the turning angle of the unit rotation mechanism 61 and φ represents the above-mentioned predetermined angle when the display surface 91 is viewed from above (in plane view).

The rotation angle θ is equal to an angle provided by adding the angle φ to an angle between the central line Lα of the amplitude in the horizontal direction when the turning angle of the unit rotation mechanism 61 is α and the line segment (straight line) LW passing through the center of the drawing region 911 and in parallel with the wall surface W1.

An angle between a ling segment Lg along the orientations of the image g and the drawing region 911 and the line segment (straight line) LW passing through the center of the drawing region 911 and in parallel with the wall surface W1 is set to be φ.

As described above, the orientations of the drawing region 911 and the image g can be in a predetermined state relative to the wall surface W1. Especially, the orientation of the image g can be set arbitrarily relative to the wall surface W1.

Embodiment 4 as described above can also provide the advantages similar to those in Embodiment 1 described before.

Embodiment 5

Next, Embodiment 5 of the image forming apparatus according to the invention will be described.

Figure 20:
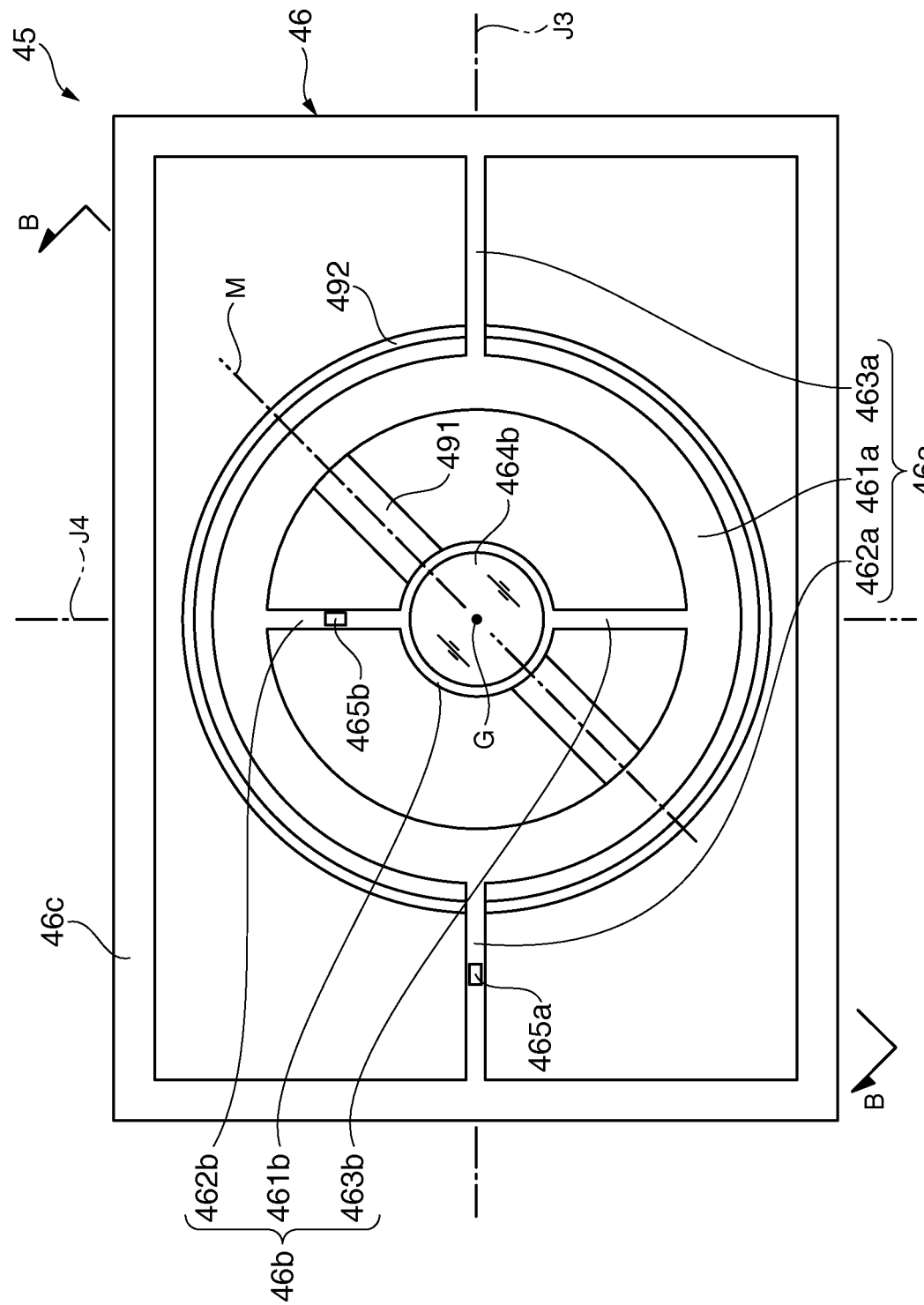
FIG. 20 is a schematic plan view showing an optical scanner of a projector included in an image forming apparatus according to Embodiment 5 of the invention.
Figure 21:
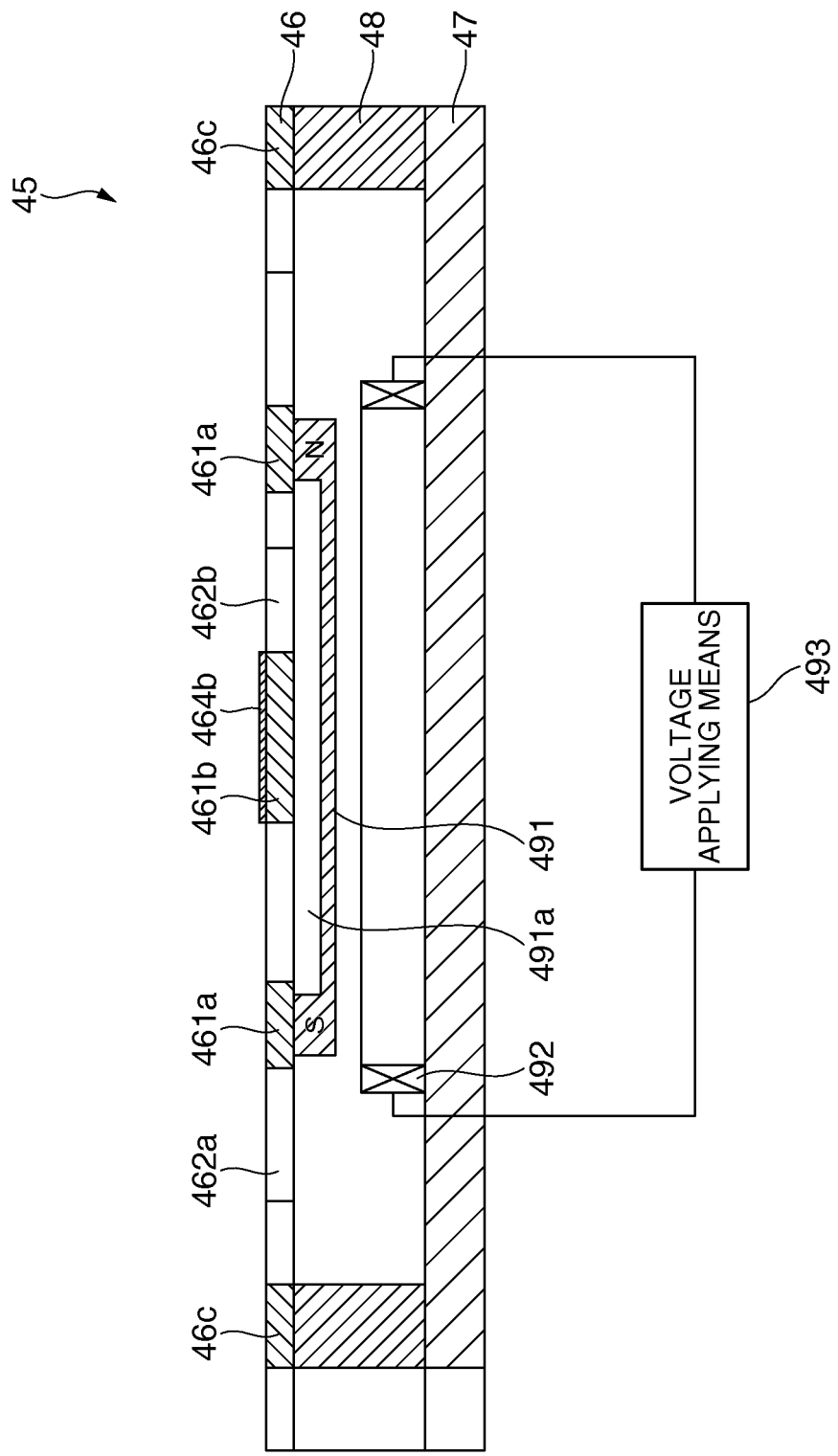
FIG. 21 is a section view taken along a line B-B in FIG. 20.
Figure 22:
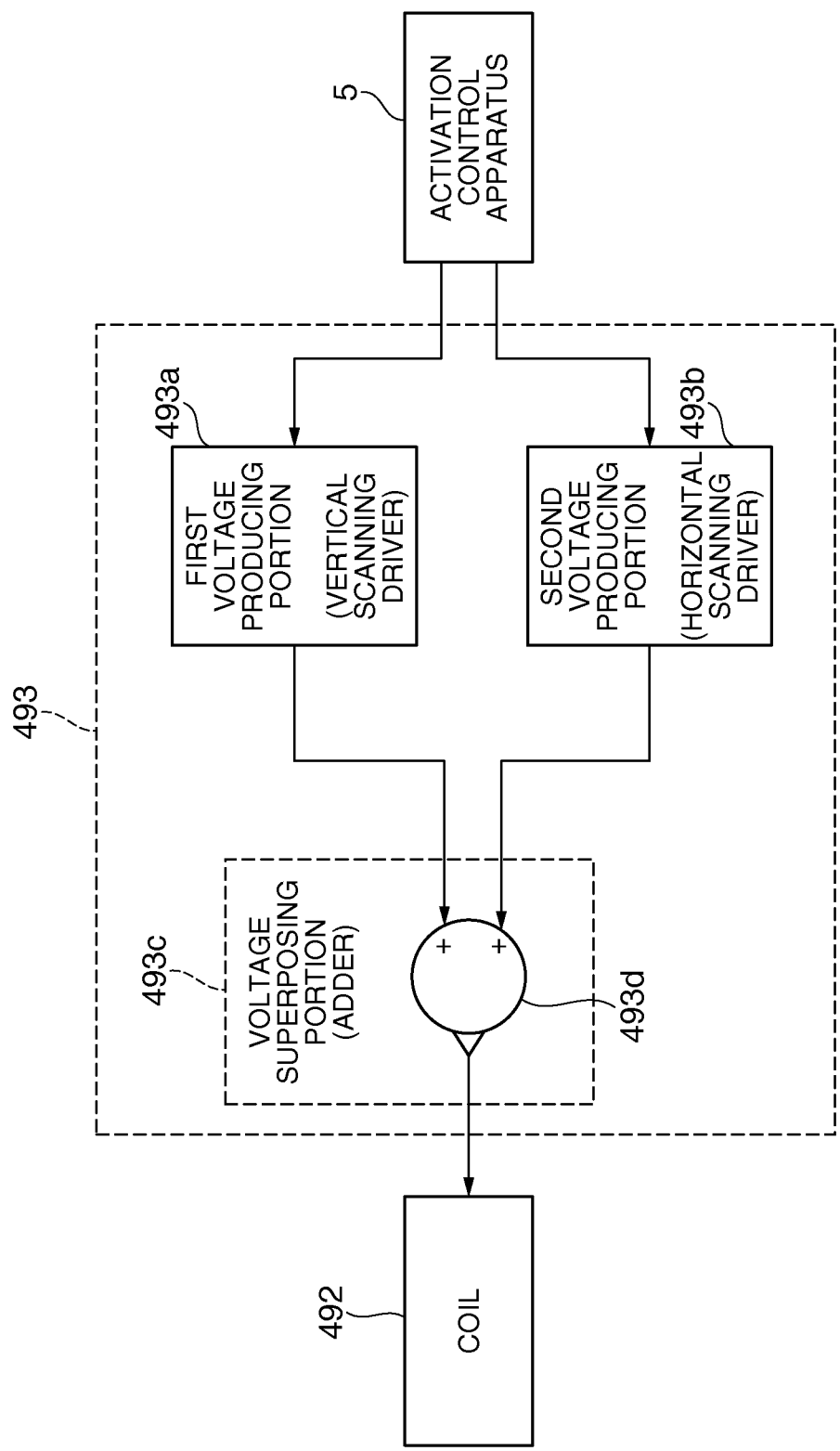
FIG. 22 is a block diagram showing voltage applying portion of driving portion included in the optical scanner shown in FIG. 21.
Figure 23A:
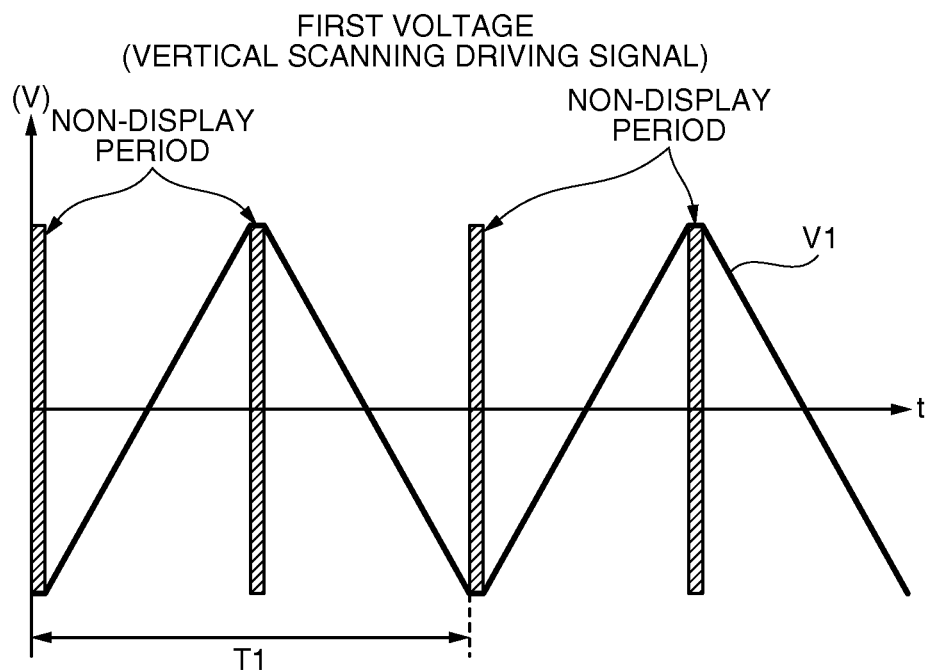
FIGS. 23A and 23B are diagrams showing an example of voltage produced in a first voltage producing portion and a second voltage producing portion included in the voltage applying portion shown in FIG. 21.
Figure 23B:
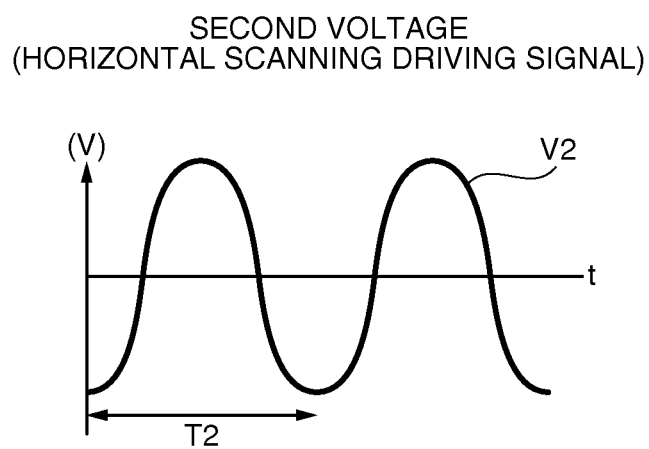

FIG. 20 is a schematic plan view showing an optical scanner of a projector included in the image forming apparatus according to Embodiment 5 of the invention. FIG. 21 is a section view taken along a line B-B in FIG. 20. FIG. 22 is a block diagram showing a voltage applying portion of a driving portion included in the optical scanner shown in FIG. 21. FIGS. 23A and 23B are diagrams showing an example of voltage produced in a first voltage producing portion and a second voltage producing portion included in the voltage applying portion shown in FIG. 21. In the following, for the convenience of description, the frontward side of the sheet is referred to as "top," the backward side of the sheet as "bottom," the right side as "right," and the left side as "left" in FIG. 20, and the upper side as "top," the lower side as "bottom," the right side as "right," and the left side as "left" in FIG. 21.

In the following, the image forming apparatus of Embodiment 5 will be described by focusing on different points from Embodiment 1 described earlier, and the description of similar points is omitted.

The image forming apparatus of Embodiment 5 is substantially similar to that of Embodiment 1 except that the optical scanner included in the projector has a different configuration and that the track of scanning in the first direction (horizontal scanning) on the display surface 91 is not straight. In FIG. 22, components similar to those of the above-mentioned embodiment are designated with the same reference numerals.

The optical scanning portion according to the embodiment has a single optical scanner 45 of a so-called two-degree-of-freedom vibration system (two-dimensional scanning).

The optical scanner 45 includes a base body 46 including a first vibration system 46a, a second vibration system 46b, and a support portion 46c as shown in FIG. 20, an opposite substrate 47 placed opposite to the base body 46, a spacer member 48 provided between the base body 46 and the opposite substrate 47, a permanent magnet 491, and a coil 492.

The first vibration system 46a is formed of a driving portion 461a of frame shape provided inside the support portion 46c of frame shape, and a pair of first coupling portions 462a and 463a supporting the driving portion 461a on the support portion 46c on both sides.

The second vibration system 46b is formed of a movable plate 461b provided inside the driving portion 461a, and a pair of second coupling portions 462b and 463b supporting the movable plate 461b on the driving portion 461a on both sides.

The driving portion 461a has an annular shape in plane view of FIG. 20. The shape of the driving portion 461a is not limited particularly as long as it has a frame shape, and for example, it may have a box frame shape in plane view of FIG. 20. The permanent magnet 491 is bonded to a lower surface of the driving portion 461a as described above.

Each of the first coupling portions 462a and 463a has a long shape and is elastically deformable. The first coupling portions 462a and 463a couple the driving portion 461a to the support portion 46c such that the driving portion 461a is turnable relative to the support portion 46c. The first coupling portions 462a and 463a as described above are provided coaxially, and the driving portion 461a is configured to be turned relative to the support portion 46c about the axis (hereinafter referred to as a "turning central axis J3").

A piezoelectric element 465a for detecting the angle of the driving portion 461a (the turning angle about the turning central axis J3) (behavior) is provided for the first coupling portion 462a.

The movable plate 461b has a circular shape in plane view of FIG. 20. The shape of the movable plate 461b is not limited particularly as long as it can be formed inside the driving portion 461a, and for example, it may have an elliptic shape or have a box shape in plane view of FIG. 20. A light reflecting portion 464b having light reflectivity is formed on an upper surface of the movable plate 461b as described above.

Each of the second coupling portions 462b and 463b has a long shape and is elastically deformable. The second coupling portions 462b and 463b couple the movable plate 461b to the driving portion 461a such that the movable plate 461b is turnable relative to the driving portion 461a. The second coupling portions 462b and 463b as described above are provided coaxially, and the movable plate 461b is configured to be turned relative to the driving portion 461a about the axis (hereinafter referred to as a "turning central axis J4").

A piezoelectric element 465b for detecting the angle of the movable plate 461b (the turning angle about the turning central axis J4) (behavior) is provided for the second coupling portion 462b.

As shown in FIG. 20, the turning central axis J3 and the turning central axis J4 are orthogonal to each other. Each of the centers of the driving portion 461a and the movable plate 461b is located at the point of intersection of the turning central axis J3 and the turning central axis J4 in plane view of FIG. 20. In the following, the point of intersection of the turning central axis J3 and the turning central axis J4 is referred to also as the "intersection point G" for the convenience of description.

As shown in FIG. 21, the base body 46 as described above is bonded to the opposite substrate 47 with the spacer member 48 interposed between them. The coil 492 which produces a magnetic field acting on the permanent magnet 491 is provided on an upper surface of the opposite substrate 47.

The permanent magnet 491 is provided along a line segment (this ling segment is referred to also as a "line segment M") passing through the intersection point G and inclined with respect to each of the turning central axis J3 and the turning central axis J4 in plane view of FIG. 20. The permanent magnet 491 as described above has the south pole on one side of the longitudinal direction relative to the intersection point G and the north pole on the other side. In FIG. 21, the left side of the longitudinal direction of the permanent magnet 491 is the sough pole and the right side is the north pole.

An inclination angle θ of the ling segment M with respect to the turning central axis J3 preferably ranges from 30 to 60 degrees, more preferably ranges from 40 to 50 degrees, and more preferably is equal to approximately 45 degrees in plane view of FIG. 20. The permanent magnet 491 provided in this manner can smoothly turn the movable plate 461b about each of the turning central axis J3 and the turning central axis J4. In the embodiment, the line segment M is inclined by approximately 45 degrees with respect to each of the turning central axis J3 and the turning central axis J4.

As shown in FIG. 21, a recess portion 491a is formed in an upper surface of the permanent magnet 491. The recess portion 491a serves as a clearance portion for preventing contact between the permanent magnet 491 and the movable plate 461b. The formation of such a recess portion 491a can prevent the movable plate 461b from coming into contact with the permanent magnet 491 in the turning of the movable plate 461b about the turning central axis J3.

The coil 492 is formed to surround the outer periphery of the driving portion 461a in plane view of FIG. 20. This can reliably prevent contact between the driving portion 461a and the coil 492 in driving the optical scanner 45. As a result, the spacing distance between the coil 492 and the permanent magnet 491 can be reduced relatively to allow the magnetic field produced from the coil 492 to effectively act on the permanent magnet 491.

The coil 492 is electrically connected to a voltage applying portion 493. When the voltage applying portion 493 applies a voltage to the coil 492, a magnetic field is produced from the coil 492 in the axis direction orthogonal to each of the turning central axis J3 and the turning central axis J4.

As shown in FIG. 22, the voltage applying portion 493 includes the first voltage producing portion 493a which produces a first voltage V1 for turning the movable plate 461b about the turning central axis J3, the second voltage producing portion 493b which produces a second voltage V2 for turning the movable plate 461b about the turning central axis J4, and a voltage superposing portion 493c which superposes the first voltage V1 on the second voltage V2 to apply the resulting voltage to the coil 492.

The first voltage producing portion 493a produces the first voltage V1 (voltage for vertical scanning) changing periodically for each period T1 which is double the frame frequency as shown in FIG. 23A, similarly to FIG. 9 in Embodiment 1.

The first voltage V1 has a waveform as a triangular wave. Thus, the optical scanner 45 can effectively perform vertical go-and-return scanning (sub-scanning) with the light. The waveform of the first voltage V1 is not limited thereto. It should be noted that the frequency (1/T1) of the first voltage V1 is not limited particularly as long as the frequency is suitable for the vertical scanning, but the frequency preferably ranges from 15 to 40 Hz (approximately 30 Hz).

In the embodiment, the frequency of the first voltage V1 is adjusted to be a frequency different from the torsion resonance frequency of the first vibration system 46a formed of the driving portion 461a and the pair of first coupling portions 462a and 463a.

On the other hand, as shown in FIG. 23B, the second voltage producing portion 493b produces the second voltage V2 (voltage for horizontal scanning) changing periodically for each period T2 different from the period T1.

The second voltage V2 has a waveform as a sine wave. Thus, the optical scanner 45 can effectively perform main scanning with the light. The waveform of the second voltage V2 is not limited thereto.

While the frequency of the second voltage V2 is not limited particularly as long as the frequency is higher than the frequency of the first voltage V1 and is appropriate for the horizontal scanning, the frequency preferably ranges from 10 to 40 kHz. The frequency of the second voltage V2 is set to 10 to 40 kHz in this manner and the frequency of the first voltage V1 is set to approximately 30 Hz as described before, so that the movable plate 461b can be turned about each of the turning central axis J3 and the turning central axis J4 at the frequency appropriate for the drawing on the screen. However, the combination of the frequency of the first voltage V1 and the frequency of the second voltage V2 or the like is not limited particularly as long as the movable plate 461b can be turned about each of the turning central axis J3 and the turning central axis J4.

In the embodiment, the frequency of the second voltage V2 is adjusted to be equal to the torsion resonance frequency of the second vibration system 46b formed of the movable plate 461b and the pair of second coupling portions 462b and 463b. This can increase the turning angle of the movable plate 461b about the turning central axis J3.

It is preferable to satisfy the relationship of $f_2 > f_1$ where $f_1$ [Hz] represents the resonance frequency of the first vibration system 46a and $f_2$ [Hz] represents the resonance frequency of the second vibration system 46b, and it is more preferable to satisfy the relationship of $f_2 \geq 10 f_2$. This can turn the movable plate 461b more smoothly about the turning central axis J3 at the frequency of the first voltage V1 and about the turning central axis J4 at the frequency of the second voltage V2.

Each of the first voltage producing portion 493a and the second voltage producing portion 493b is connected to the activation control apparatus 5 and is driven on the basis of the signal from the activation control apparatus 5. The voltage superposing portion 493c is connected to each of the first voltage producing portion 493a and the second voltage producing portion 493b.

The voltage superposing portion 493c includes an adder 493d for applying the voltage to the coil 492. The adder 493d receives the first voltage V1 from the first voltage producing portion 493a, receives the second voltage V2 from the second voltage producing portion 493b, and superposes those voltages and applies the resulting voltage to the coil 492.

The optical scanner 45 configured as above is driven in the following manner.

For example, the first voltage V1 as shown in FIG. 23A and the second voltage V2 as shown in FIG. 23B are superposed in the voltage superposing portion 493c and the superposed voltage is applied to the coil 492 (the superposed voltage is referred to also as a "voltage V3").

Then, the voltage corresponding to the first voltage V1 in the voltage V3 causes switching between the magnetic field attracting the south pole side of the permanent magnet 491 toward the coil 492 and bringing the north pole side away from the coil 492 and the magnetic field bringing the south pole side of the permanent magnet 491 away from the coil 492 and attracting the north pole side toward the coil 492. This turns the driving portion 461a together with the movable plate 461b about the turning central axis J3 at the frequency of the first voltage V1 while torsionally deforming the first coupling portions 462a and 463a.

The frequency of the first voltage V1 is set to be extremely lower than the frequency of the second voltage V2, and the resonance frequency of the first vibration system 46a is designed to be lower than the resonance frequency of the second vibration system 46b. For this reason, the first vibration system 46a is easily vibrated than the second vibration system 46b, and the movable plate 461b can be prevented from turning about the turning central axis J4 by the first voltage V1.

On the other hand, the voltage corresponding to the second voltage V2 in the voltage V3 causes switching between the magnetic field attracting the south pole side of the permanent magnet 491 toward the coil 492 and bringing the north pole side away from the coil 492 and the magnetic field bringing the south pole side of the permanent magnet 491 away from the coil 492 and attracting the north pole side toward the coil 492. This turns the movable plate 461b about the turning central axis J4 at the frequency of the second voltage V2 while torsionally deforming the second coupling portions 462b and 463b.

Since the frequency of the second voltage V2 is equal to the torsion resonance frequency of the second vibration system 46b, the movable plate 461b can be turned about the turning central axis J4 predominantly by the second voltage V2. For this reason, the movable plate 461b can be prevented from turning together with the driving portion 461a about the turning central axis J3 by the second voltage V2.

According to the above-mentioned optical scanner 45, the single actuator can be used to perform the two-dimensional scanning with the laser light (light) to save space in the optical scanning portion 4. In addition, for example when the pair of optical scanners is used as in Embodiment 1, the relative position relationship between the optical scanners should be set with high accuracy, but such setting is not required in the embodiment and thus the manufacture can be facilitated.

Embodiment 5 as described above can also achieve the advantages similar to those in Embodiment 1 described above.

While the image forming apparatus according to the invention has been described on the basis of the embodiments as shown, the invention is not limited thereto, and the configuration of each of the components can be replaced with an arbitrary configuration having the similar function. Another arbitrary constituent may be added to the invention. In addition, the invention may be a combination of arbitrary two or more of the configurations (features) of each of the embodiments described above.

While the embodiments have been described with the case where the display surface on which the image is displayed is set on the floor surface, such a display surface is not limited thereto, and for example, a wall surface of a wall may be used or a ceiling surface of a ceiling may be used.

The projector and the display surface may be placed on the same surface (a wall surface, a floor surface, or a ceiling surface). The projector may be placed on one of parallel surfaces (for example, wall surfaces, or a floor surface and a ceiling surface) and the display surface may be placed on the other.

While the above-mentioned embodiments have been described with the example in which the motor is used as the driving source of the unit turning portion and the scanner turning portion, the invention is not limited thereto, and for example, a solenoid may be used.

While the above-mentioned embodiments have been described with the example in which the driving force of the motor is transferred to the support portion with the pair of gears in the unit turning portion, the method of transferring the driving force is not limited thereto, and for example, it is possible to use a method such as belt drive or a method in which the axis of the motor is directly attached to the support portion.

The drawing position changing portion can also be realized by providing an optical component such as a turnable mirror and a prism on the optical path between the optical scanner 41 and the optical scanner 42.

The drawing position changing portion can also be realized by changing the central position of the amplitude in the turning of the movable plates of the optical scanners 41 and 42. In this case, for example, a different bias voltage may be selectively superposed on the driving signal.

While the pair of optical scanners is used as the optical scanning portion in Embodiment 1 described above, the invention is not limited thereto and for example, an optical scanner and a galvano mirror may be used. In this case, the galvano mirror is preferably used for the vertical scanning.

While the embodiments have been described with the case where the image forming apparatus includes the single projector, the invention is not limited thereto, and the number of the projectors included in the image forming apparatus may be two or more.

While the first direction is set to the "horizontal direction" and the second direction is set to the "vertical direction" in the embodiment, the invention is not limited thereto, and for example, the first direction is set to the "vertical direction" and the second direction is set to the "horizontal direction."

While the three dichroic mirrors are used to combine the laser light of red color, the laser light of green color, and the laser light of blue color to apply the one laser light (light) in the embodiments described above, the combination may be performed by using a dichroic prism or the like.

While the above embodiments have been described of the configuration in which the light source unit 3 has the laser light source which emits the laser of red color, the laser light source which emits the laser of blue color, and the laser light source which emits the laser of green color, the invention is not limited thereto. For example, the light source unit 3 may have a laser light source which emits laser of red color, a laser light source which emits laser of blue color, a laser light source which emits laser of ultraviolet. In this case, the screen includes a fluorescent material which produces a green fluorescence in response to application of the ultraviolet laser. This can display images in full color on the display surface.

The entire disclosure of Japanese Patent Application No. 2010-089272, filed on Apr. 8, 2010 is expressly incorporated by reference herein.

What is claimed is:

1. An image forming apparatus comprising:
a light emitting portion emitting light;
an optical scanning portion scanning a display surface with the light emitted from the light emitting portion;
a changing portion rotating an image formed on the display surface through the scanning with the light by using a position near the center as a rotation axis to change an orientation of the image;
a drawing position changing portion changing a position of the image;
a sensing portion sensing whether or not a human is present within a sensing region set near the display surface and sensing a moving state of the human when the human is present within the sensing region; and
a control portion controlling driving of the drawing position changing portion based on a sensing result of the sensing portion, wherein
the changing portion changes the orientation of the image based on an activation state of the drawing position changing portion, and
when the human is moving within the sensing region, the control portion controls the driving of the drawing position changing portion such that the position of the image is changed to remain located forward of the moving direction of the human.

2. The image forming apparatus according to claim 1, wherein the drawing position changing portion has a unit turning mechanism turning the light emitting portion and the optical scanning portion, and
wherein the changing portion changes the orientation of the image based on a turning angle of the light emitting portion and the optical scanning portion with the unit turning mechanism.

3. The image forming apparatus according to claim 2, wherein the unit turning mechanism turns the light emitting portion and the optical scanning portion about an axis line orthogonal to the display surface.

4. The image forming apparatus according to claim 1, wherein the changing portion changes the orientation of the image based on the activation state of the drawing position changing portion and the sensing result of the sensing portion.

5. The image forming apparatus according to claim 4, wherein the changing portion changes the orientation of the image to be fixed relative to an orientation of the human.

6. The image forming apparatus according to claim 1, wherein the changing portion has a function of performing rotation processing of video data.

7. The image forming apparatus according to claim 6, wherein the changing portion has a video data storing portion storing the video data, a video data computing portion having a function of performing the rotation processing of the video data stored in the video data storing portion, and a light source modulating portion driving the light emitting portion based on the computing result of the video data computing portion.

8. The image forming apparatus according to claim 1, wherein the optical scanning portion includes an optical scanner provided with a movable plate including a light reflecting portion reflecting the light emitted from the light emitting portion, the movable plate being turnable about a single axis or two axes orthogonal to each other, the optical scanner performing scanning with the light reflected by the light reflecting portion through the turning.

9. The image forming apparatus according to claim 1, wherein the light emitting portion emits laser light.

* * * * *